United States Patent
Kim

(10) Patent No.: US 9,794,620 B2
(45) Date of Patent: Oct. 17, 2017

(54) SYSTEM AND METHOD FOR PROVIDING RELATED CONTENT AT LOW POWER, AND COMPUTER READABLE RECORDING MEDIUM HAVING PROGRAM RECORDED THEREIN

(71) Applicant: SOUNDLLY INC., Seoul (KR)

(72) Inventor: Tae Hyun Kim, Seoul (KR)

(73) Assignee: SOUNDLLY INC., Seoul (KR)

( * ) Notice: Subject to any disclaimer, the term of this patent is extended or adjusted under 35 U.S.C. 154(b) by 0 days.

(21) Appl. No.: 15/124,928

(22) PCT Filed: Jan. 28, 2015

(86) PCT No.: PCT/KR2015/000890
§ 371 (c)(1),
(2) Date: Sep. 9, 2016

(87) PCT Pub. No.: WO2015/137621
PCT Pub. Date: Sep. 17, 2015

(65) Prior Publication Data
US 2017/0019703 A1    Jan. 19, 2017

(30) Foreign Application Priority Data

Mar. 11, 2014 (KR) .......... 10-2014-0028614
May 19, 2014 (KR) .......... 10-2014-0059864

(51) Int. Cl.
*H04N 21/41* (2011.01)
*H04N 21/439* (2011.01)
(Continued)

(52) U.S. Cl.
CPC ....... *H04N 21/4394* (2013.01); *G10L 19/018* (2013.01); *H04N 21/4126* (2013.01);
(Continued)

(58) Field of Classification Search
CPC ......... H04N 21/4126; H04N 21/41407; H04N 21/42203; H04N 21/4436; H04N 21/4722;
(Continued)

(56) References Cited

U.S. PATENT DOCUMENTS

| 2001/0055391 A1* | 12/2001 | Jacobs | ............... G06Q 30/0601 380/241 |
| 2002/0023142 A1* | 2/2002 | Michaelis | ......... G06F 17/30743 709/217 |

(Continued)

FOREIGN PATENT DOCUMENTS

| EP | 2487680 | 8/2012 | ............ G10L 19/00 |
| EP | 2663068 | 11/2013 | ............ H04M 11/00 |

(Continued)

OTHER PUBLICATIONS

International Search Report (ISR) dated Apr. 28, 2014 in PCT/KR2015/000890 published as WO 2015/137621 with English Translation.

(Continued)

*Primary Examiner* — Melur Ramakrishnaiah
(74) *Attorney, Agent, or Firm* — Harness, Dickey & Pierce, P.L.C.

(57) ABSTRACT

Provided is a system for providing related content comprising the steps of: sensing a sound output from a content reproducing device for reproducing content (referred to as "main content"); converting the sensed sound into digital data; extracting an acoustic wave ID from the digital data; selecting related content corresponding to the acoustic wave ID; and displaying the related content in an image and/or speech by a mobile receiver.

19 Claims, 17 Drawing Sheets

(51) Int. Cl.
| | |
|---|---|
| *H04N 21/414* | (2011.01) |
| *H04N 21/422* | (2011.01) |
| *H04N 21/443* | (2011.01) |
| *H04N 21/4722* | (2011.01) |
| *H04N 21/8352* | (2011.01) |
| *G10L 19/018* | (2013.01) |

(52) U.S. Cl.
CPC . *H04N 21/41407* (2013.01); *H04N 21/42203* (2013.01); *H04N 21/4436* (2013.01); *H04N 21/4722* (2013.01); *H04N 21/8352* (2013.01)

(58) Field of Classification Search
CPC ............ H04N 21/8352; H04N 21/4394; G10L 19/018
USPC ....... 381/56, 1–2; 704/270.1, 257, 270, 275; 709/206, 217, 224, 248
See application file for complete search history.

(56) References Cited

U.S. PATENT DOCUMENTS

| | | | |
|---|---|---|---|
| 2008/0181058 A1 | 7/2008 | Hayakawa | 367/125 |
| 2012/0150890 A1 | 6/2012 | Jeong et al. | 707/758 |
| 2012/0294463 A1 | 11/2012 | Chu et al. | 381/150 |
| 2013/0103403 A1* | 4/2013 | McClendon | H04M 1/72522 704/270.1 |
| 2013/0252597 A1 | 9/2013 | Jin et al. | 455/418 |
| 2013/0279300 A1* | 10/2013 | Iwase | H04N 21/237 367/197 |
| 2013/0279699 A1* | 10/2013 | Suzuki | H04R 5/04 381/2 |
| 2016/0088353 A1 | 3/2016 | Kim | |

FOREIGN PATENT DOCUMENTS

| | | | |
|---|---|---|---|
| JP | 2013-232182 | 11/2013 | ............ G06F 13/00 |
| KR | 10-2003-005279 | 1/2003 | ............ G06F 17/30 |
| KR | 10-0893671 | 4/2009 | ............ G06F 17/30 |
| KR | 10-0952894 | 4/2010 | ............ G10L 25/78 |
| KR | 10-2012-0038120 | 4/2012 | ............ H04W 64/00 |
| KR | 10-2012-0053286 | 5/2012 | ............ G01S 3/80 |
| KR | 10-2012-0064582 | 6/2012 | ............ G06F 17/30 |
| KR | 10-2012-0067477 | 6/2012 | ........... H04N 21/254 |
| KR | 10-2012-0078410 | 7/2012 | ............ H04W 4/02 |
| KR | 10-2012-0078446 | 7/2012 | ............ G06Q 50/30 |
| KR | 10-2012-0129347 | 11/2012 | ............ H04B 1/40 |
| KR | 10-2013-0033092 | 4/2013 | ........ H04N 21/4408 |
| KR | 10-2013-0107604 | 9/2013 | ............ H04B 11/00 |
| KR | 10-1310943 | 9/2013 | ........ H04N 21/4408 |
| KR | 10-1313293 | 9/2013 | ........... H04N 21/254 |
| KR | 10-2013-0107340 | 10/2013 | ............ H04W 4/02 |
| KR | 10-1363454 | 2/2014 | ............ H04N 21/45 |
| KR | 101363454 | 2/2014 | ............ H04N 21/45 |
| KR | 20140126237 | 10/2014 | ............ H04N 21/45 |

OTHER PUBLICATIONS

Extended European Search Report from corresponding European Application No. 1576122 dated Dec. 19, 2016.

* cited by examiner

SYSTEM AND METHOD FOR PROVIDING RELATED CONTENT AT LOW POWER, AND COMPUTER READABLE RECORDING MEDIUM HAVING PROGRAM RECORDED THEREIN

CROSS-REFERENCE TO RELATED APPLICATIONS

This application is a national phase application of PCT Application No. PCT/KR2015/000890, filed on 28 Jan. 2015, which claims benefit of Korean Patent Application 10-2014-0059864, filed on 19 May 2014 and Korean Patent Application 10-2014-0028614, filed on 11 Mar. 2014. The entire disclosure of the application identified in this paragraph is incorporated herein by reference.

FIELD

The present invention relates to a system and a method for providing a related content at low power, which receives a sound included in a content at low power and provides a related content, and a computer readable recording medium having a program recorded therein.

The present invention was supported by National Research and Development Project Business of the Ministry of Science, ICT and Future Planning, as follows:

[National Research and Development Project Business supporting the present invention]

[Project Number] R07581510960001002

[Related Department] Ministry of Science, ICT and Future Planning

[Research Management Specialized Agency] Institute for Information & Communications Technology Promotion

[Research Business Name] ICT emerging technology development (ICT Small and Medium/Venture Enterprises Technology Development Support)

[Research Project Title]

TV-Mobile Interworking Next-generation Customized Advertisement Platform Development using Small Loudness Inaudible Sound Wave Communications

BACKGROUND

Related-art product advertisement methods include not only a direct advertisement method which directly provides an advertisement through newspaper, radio, and a TV broadcast, but also a method which advertises a product indirectly by applying a product to be advertised to a prop which appears in a content such as a movie, a drama, a radio broadcast, or the like, or a product which is naturally mentioned as a part of the content (hereinafter, a product indirect advertisement or an indirect advertisement). In particular, in the case of the product indirect advertisement, a powerful advertisement effect can be provided to viewers and listeners, and its importance increases. However, the related-art indirect advertisement simply exposures products on a screen or merely mentions as a sound. Therefore, there is a problem that viewers or listeners should separately search for relevant information and retailers on the products, and then purchase the products based on the searched information when they desire to purchase the products. Various technologies for solving this problem have been suggested. For example, Korean Patent Registration No. 10-1310943 (Sep. 11, 2013) (System and Method for Providing Content-Related Information Related to Broadcast Content), Korean Patent Registration No. 10-1313293 (Sep. 24, 2013) (System and Method for Providing Additional Information of Broadcast Content), and Korean Patent Registration No. 10-0893671 (Apr. 9, 2009) (Generation and Matching of Hashes of Multimedia Content) disclose methods for providing a related content on a product indirect advertisement included in a content that a viewer or a listener views or listens to through their mobile receivers, using a sound characteristic of the broadcasted or played content. In another example, Korean Patent Registration No. 10-1363454 (Feb. 10, 2014) (System for Providing User-Customized Advertisement Based On Sound Signal Outputted from TV, Method for Providing User-Customized Advertisement, and Computer Readable Recording Medium Having MIM Service Program Recorded Therein) discloses a method for providing a related content on a product indirect advertisement included in a content that a viewer or a listener views or listens to through their mobile receivers by inserting a non-audible sound wave into the broadcasted or played content.

However, the above-explained technologies still have a problem that the viewer or listener should actively request the related content using their own mobile receivers. That is, when a content is played, the user should execute an application of the mobile receiver to receive a related content, or should instruct the application of the mobile receiver which provides the related content to recognize the content. Requiring the user to make an extra effort to receive the related content is contrary to the behavior pattern of the viewer or the listener who passively enjoys the content, or making the extra effort may interfere with viewer's or listener's immersion. Therefore, the efficiency of the related content may be reduced.

This problem may be overcome by continuously extracting a sound characteristic or a non-audible sound wave in the mobile receiver. However, this may cause power shortage in the mobile receiver which operates by a limited battery.

DETAILED DESCRIPTION

Technical Object

An exemplary embodiment of the present invention provides a low-power related content providing system which normally operates at low power and can automatically provide a related content on a main content that a viewer or listener is viewing or listening to without requiring the viewer or listener to actively find the related content.

An exemplary embodiment of the present invention provides a low-power related content providing system, which extracts a sound wave ID included in a main content which is broadcasted or played through a content playing device at low power, and can provide a related content on an indirect advertisement product included in the main content without requiring a viewer or listener to make an extra effort through a mobile receiver, or without interfering with user's immersion on the main content.

An exemplary embodiment of the present invention provides a low-power related content providing method which normally operates at low power and can automatically provide a related content on a main content that a viewer or listener is viewing or listening to without requiring the viewer or listener to actively find the related content.

An exemplary embodiment of the present invention provides a method for providing a related content, which extracts a sound wave ID included in a main content which is broadcasted or played through a content playing device at low power, and can provide a related content on an indirect advertisement product included in the content without requiring a viewer or listener to make an extra effort through a mobile receiver, or without interfering with user's immersion on the main content.

An exemplary embodiment of the present invention provides a recording medium having a program recorded therein for executing, through a computer, a low-power related content providing method, which normally operates at low power and can automatically provide a related content on a main content that a viewer or listener is viewing or listening to without requiring the viewer or listener to actively find the related content.

An exemplary embodiment of the present invention provides a recording medium having a program recorded therein for executing, through a computer, a method for providing a related content, which extracts a sound wave ID included in a main content which is broadcasted or played through a content playing device at low power, and can provide a related content on an indirect advertisement product included in the main content without requiring a viewer or listener to make an extra effort through a mobile receiver, or without interfering with user's immersion on the main content.

Technical Solving Method

According to an embodiment of the present invention, there is provided a system and a method for providing a related content at low power, or a computer readable recording medium having a program recorded therein.

According to an exemplary embodiment, there is provided a method for providing a related content, the method including the steps of: detecting a sound which is outputted from a content playing device which reproduces a content (referred to as a "main content"); converting the detected sound into digital data; extracting a sound wave ID from the digital data; selecting a related content corresponding to the sound wave ID; and displaying, by a mobile receiver, the related content as an image and/or voice.

According to an exemplary embodiment, there is provided a mobile receiver for providing a related content, which includes a memory and a processor, the mobile receiver including: a microphone configured to detect a sound which is outputted from a content playing device which reproduces a content (referred to as a "main content"); an ADC configured to convert the sound detected by the microphone into digital data; a sound wave ID extraction unit configured to extract a sound wave ID from the digital data; and a display unit configured to display a related content selected according to the sound wave ID.

According to an exemplary embodiment, there is provided a computer readable medium which has a program recorded therein, for executing a method for providing a related content in a computer, the computer including a memory, a processor, a microphone which detects a sound outputted from a content playing device which produces a content (referred to as a "main content"), and an ADC which converts the sound detected by the microphone into digital data, wherein the method for providing the related content includes the steps of: extracting a sound wave ID from the digital data; and displaying a related content which is selected according to the sound wave ID through a display unit provided in the computer.

Advantageous Effects

According to one or more embodiments of the present invention, a sound wave ID included in a main content which is broadcasted or played through a content playing device is extracted at low power, and a related content on an indirect advertisement product included in the main content can be provided without requiring a viewer or listener to make an extra effort through a mobile receiver, or without interfering with user's immersion on the main content.

EXPLANATION OF SIGNS

Figure 1:
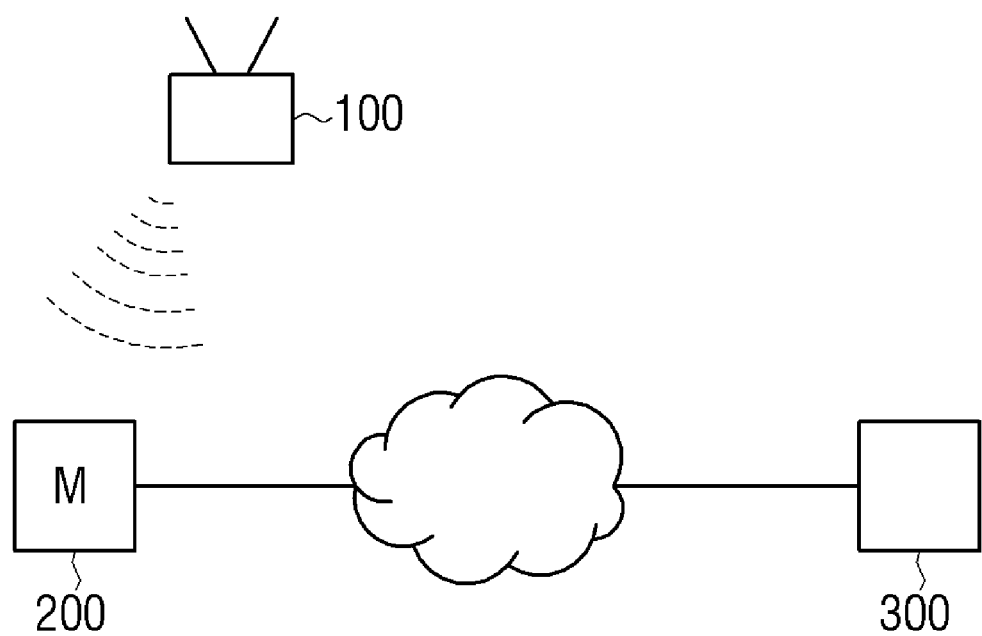
FIG. 1 is a view to illustrate a related content providing system which provides a related content using a sound wave ID according to an exemplary embodiment of the present invention.

100: content playing device
201, 401: microphone
203, 403: ADC
205: sound wave ID extraction unit
207, 407: processor
209, 409: memory
211, 411: storage device
213, 413: display unit
215, 415: communication unit 221, 421: DMB application, video player, or codec
223, 423: related content providing application
200, 400: mobile receiver
300 server
402: low-power sound intensity measurement unit
404: sound wave pattern recognition unit

BEST MODE FOR EMBODYING THE INVENTION

Exemplary embodiments will now be described more fully with reference to the accompanying drawings to clarify aspects, other aspects, features and advantages of the present invention. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

The terms used herein are for the purpose of describing particular exemplary embodiments only and are not intended to be limiting. As used herein, the singular forms are intended to include the plural forms as well, unless the context clearly indicates otherwise. It will be further understood that the terms "comprises" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the present invention.

DEFINITION OF TERMS

Content: The content recited herein is digital data in the form of an image, a sound, or a combination of a sound and an image, and refers to information for providing educational, cultural, informational, and/or amusement values.

Content playing device: The content playing device recited herein refers to a device for playing a content, and for example, includes a speaker or a sound output terminal for outputting a sound, and further includes a monitor or an image output terminal, like a TV, a radio, a desktop computer, or a mobile device (for example, a laptop computer, a tablet computer, a smart phone, a wearable computer, or the like).

Content: The content recited herein may refer to i) a main content or a related content, or ii) both the main content and the related content.

Main content: The main content is a content which is outputted (broadcasted or played) through the content playing device.

Related content: The related content is a content which is outputted through a mobile receiver, and refers to information of a sound, an image, a document, an Internet address or the like related to details of the main content which is outputted through the content playing device, or related to background knowledge for delivering the details, and/or a digital identifier value indicating said information. For example, the related content may be a content which is difficult to be included in the main content due to restrictions on a schedule of contents or restrictions on related regulations, a content which induces viewers or listeners to participate, a content regarding an indirect advertisement which has difficulty in attracting viewers or listeners' attention, or information regarding a product which appears in an indirect advertisement or a content for purchasing the product.

Mobile receiver: The mobile receiver is a device which is able to output a related content, and is a mobile device which includes a microphone and an analogue-digital converter (ADC) to analyze a sound included in a main content, and grasps a main content by analyzing a sound of the main content or grasps a relative time location of the main content, and then provides a related content regarding an entirety or a part of the main content to a content viewer or listener in such a form that the related content is recognized with eyes or ears. In this case, the viewer or listener may be a person who owns the mobile receiver. For example, the mobile receiver may be a mobile device such as a laptop computer, a tablet computer, a smart phone, a wearable device, or the like.

Product indirect advertisement or indirect advertisement: This term refers to an advertisement which is included as an entirety or a part of a main content, like a product, a service, a brand logo, a tagline, or the like, and is an advertisement which is outputted as a part of an image or a part of a sound of the main content. The product indirect advertisement or the indirect advertisement is a concept which includes a sponsorship advertisement (that is, merchandise is provided free or at a reduced price when a content is produced, and then the merchandise is exposed as a part of the content). A related content is, for example, a content related to the product indirect advertisement or indirect advertisement.

Indirect advertisement product: This term refers to a product or a service which is outputted as an entirety or a part of a main content by the product indirect advertisement or indirect advertisement, and is used to indicate a service, a brand, a logo, and a tagline as well as a product having a specific form.

Sound wave ID (identifier): The sound wave ID refers to (1) digital data (i.e., non-audible sound wave ID) indicating a non-audible sound which is artificially inserted into a sound of a main content, or (2) condensed digital data (i.e., audible fingerprint ID) indicating a characteristic of a sound which can be extracted from a sound included as a part of a main content. The artificially inserted non-audile sound wave ID has a characteristic of being modulated to a non-audible sound wave which is inaudible to persons using psychoacoustics. The audible fingerprint sound wave ID indicating a characteristic of a sound is not necessary artificially inserted, but may be extracted only when a main content includes a sound. The two types of sound wave IDs may be used to (1) identify a main content, (2) identify a relative time location in the main content, (3) identify a related content related to an indirect advertisement in the main content, or (4) identify a related content related to an indirect advertisement at the relative time location in the main content. The non-audible sound wave ID may include a serial number, a meaningful word, Internet link, or the like. The audible fingerprint sound wave ID may be extracted using technologies, such as Singular/Eigen Value Decomposition (SVD/EVD), Principal Component Analysis (PCA), Peak Landmarks Detection, Zero-crossing counting, Mel Frequency Cepstral Coefficient (MFCC), Perceptual Linear Prediction Coefficient (PLPC), Linear Prediction Coefficient (LPC), or the like, as a hash function, and an extracted value may be used as a hash key. For easy description of the non-audible sound wave ID, the non-audible sound wave ID may indicate any one of a non-audible sound wave in an analogue form converted from digital data, digital data before modulation, and digital data after demodulation. In addition, for easy description, the audible fingerprint sound wave ID which is obtained by extracting a characteristic of a sound may indicate any one of extracted characteristic digital data, a part of a main content sound from which the characteristic digital data is extractable, a part of a main content sound from which the characteristic digital data detected by a mobile receiver is extractable, and characteristic digital data extracted by the mobile receiver.

Sound recognition module: This term is used to indicate at least one element which is used to detect and extract a sound wave ID, and for example, may refer to at least one of a microphone, an ADC, a sound wave ID extraction unit, and a related content providing application.

Related Content Providing System

FIG. 1 is a view to illustrate a system for providing a related content using a sound wave ID (hereinafter, referred to as a "related content providing system") according to an exemplary embodiment of the present invention.

Referring to FIG. 1, the related content providing system is a system which provides a related content related to an entirety or a part of a main content outputted from a content playing device 100 through a mobile receiver 200.

For example, the mobile receiver 200 may provide a related content including an advertisement related to at least one of an image and a sound outputted as the main content. For example, the mobile receiver 200 may provide a related content regarding an indirect advertisement product which is displayed as an image or mentioned as a sound in the main content. According to an exemplary embodiment, when there are a plurality of indirect advertisement products displayed as images or mentioned as sounds in the main content, the mobile receiver 200 may provide related contents regarding the respective products.

The related content providing system according to an exemplary embodiment may include the content playing device 100, the mobile receiver 200, and a server 300.

The content playing device 100 may output an image and/or a sound. The mobile receiver 200 may extract at least one sound wave ID from the sound outputted from the content playing device 100. For example, the sound wave ID may match the related content through a related content database (DB) (i.e., a DB in which sound wave IDs and related contents match each other).

For example, the sound wave ID may be used to identify a main content, identify a relative time location in the main content, identify a related content related to (corresponding to) an indirect advertisement in the main content, or identify a related content related to (corresponding to) an indirect advertisement at the relative time location in the main content.

The content playing device 100 may include a speaker or a sound output terminal for playing a sound, and further include a monitor or an image output terminal for displaying an image, like a TV, a radio, a desktop computer, and a mobile device (for example, a laptop computer, a tablet computer, a smart phone, a wearable device, or the like).

The mobile receiver 200 is a mobile device which extracts a sound wave ID included in a sound of a main content outputted from the content playing device 100, and provides a related content corresponding to the sound wave ID to a viewer or a listener of the main content in such a form that the related content is recognized with eyes or ears. In this case, the viewer or listener may be a person who owns the mobile receiver. For example, the mobile receiver 200 may include a mobile device such as a laptop computer, a tablet computer, a smart phone, a wearable device, or the like. In addition, the mobile receiver 200 may include a microphone (not shown) to receive the sound wave ID and an ADC (not shown).

In an exemplary embodiment, when the sound wave ID is extracted, the mobile receiver 200 transmits the sound wave ID to the server 300, and receives the related content corresponding to the sound wave ID from the server 300 and displays the related content as a sound or an image. For example, the mobile receiver 200 may display the related content corresponding to the sound wave ID for the user in the form of a notification message, an image, and/or a voice.

In an exemplary embodiment, the mobile receiver 200 is a device which has mobility like a mobile device such as a laptop computer, a tablet computer, a wearable computer, a smart phone, or the like, and may include a microphone (not shown) to recognize a sound, a communication unit (not shown) to communicate with the server, a computer processor (not shown), a memory (not shown), and a program (not shown). Herein, the program may be loaded into the memory under the control of the computer processor to perform overall operations (for example, operations of recognizing a sound wave ID, transmitting the recognized sound wave ID to the server 300, and displaying a related content received from the server 300 in the form of a notification message, an image, and/or a voice).

Next, description on how a sound wave ID is included in a content will be provided.

A technique of inserting a sound wave ID into a main content and extracting the sound wave ID may use technologies disclosed in the following patent documents.

For example, a technique of inserting an ID into a sound and a technique of extracting the content ID from the sound wave may use technology disclosed in Korean Patent Application No. 10-2012-0038120, filed on Apr. 12, 2012, by the same inventor with the KIPO (titled "Method and System for Estimating Location of Mobile Terminal Using Sound System, and Sound System Using the Same").

In another example, technology disclosed in Korean Patent Application No. 10-2012-0078410, filed on Jul. 18, 2012, by the inventor of this application with the KIPO (titled "Method and System for Collecting Proximity Data") (the features of including an ID in a sound signal and recognizing and extracting the ID included in the sound signal) may be used.

In another example, technology disclosed in Korean Patent Application No. 10-2012-0053286, filed on May 18, 2012, by the inventor of this application with the KIPO (titled "System for Identifying Speaker and Location Estimation System Using the Same") (the features of including an ID in a sound signal and recognizing and extracting the ID included in the sound signal) may be used.

In another example, technology disclosed in Korean Patent Application No. 10-2012-0078446, filed on Jul. 18, 2012, by the inventor of this application with the KIPO (titled "Method and Apparatus for Calculating Intimacy Between Users Using Proximity Information") (the features of including an ID in a sound signal and recognizing and extracting the ID included in the sound signal) may be used.

In another example, technology disclosed in Korean Patent Application No. 10-2013-0107604, filed on Sep. 6, 2013, by the inventor of this application with the KIPO (titled "Method for Transmitting and Receiving Sound Wave Using Time-Varying Frequency Based-Symbol, and Apparatus Using the Same") (the features of including digital information in a sound signal and recognizing and extracting the digital information included in the sound signal) may be used.

The technologies disclosed in the specifications of the above-mentioned Patent Application Nos. 10-2012-0038120, 10-2012-0078410, 10-2012-0053286, 10-2012-0078446, and 10-2013-0107604 are incorporated into the specification of the present application and are dealt with as a part of the specification of the present application.

A technique of extracting an audible fingerprint sound wave ID corresponding to a characteristic of a sound included in a main content may use technologies disclosed in the following patent documents.

For example, technologies disclosed in Korean Patent Registration Nos. 10-1310943 (Sep. 11, 2013) (titled "System and Method for Providing Content Related Information Related to Broadcast Content"), 10-1313293 (Sep. 24, 2013) (titled "System for Providing Additional Information of Broadcast Content and Method Thereof"), and 10-0893671 (Apr. 9, 2009) (titled "Generation and Matching of Hashes of Multimedia Content) may be used.

The technologies disclosed in the specifications of the above-mentioned Korean Patent Registration Nos. 10-1310943, 10-1313293, and 10-0893671 are incorporated into the specification of the present application and are dealt with as a part of the specification of the present application.

The server 300 may receive the sound wave ID from the mobile receiver 200, and select a related content corresponding to the sound wave ID with reference to a related content DB (not shown) in which sound wave IDs match related contents, and transmits the selected related content to the mobile receiver 200.

In an exemplary embodiment, the server 200 may be an advertisement server which stores and manages advertisements, or may be a Multimedia Instant Messenger (MIM) service server which transmits a fingerprint and/or multimedia data to friends belonging to the same group.

When the server 200 is implemented by using the MIM service server, the server 200 may transmit the related content to a client program which interacts with the MIM service server.

Mobile Receiver for Extracting a Sound Wave ID

Figure 2:
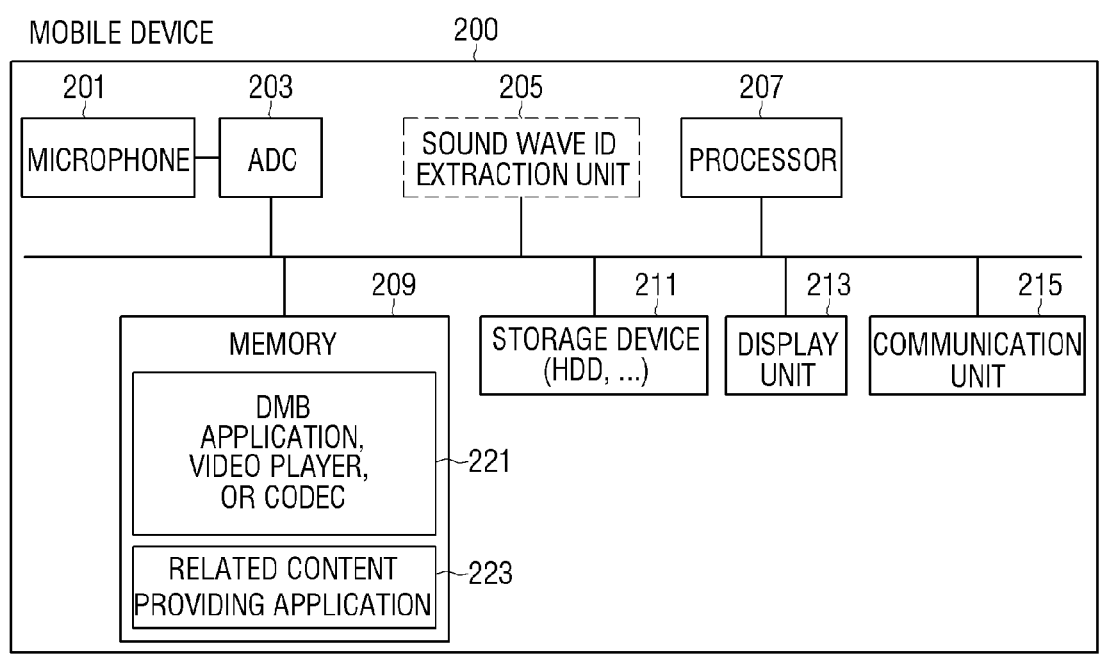
FIG. 2 is a view to illustrate an exemplary embodiment of a mobile receiver.

FIG. 2 is a view to illustrate an exemplary embodiment of a mobile receiver.

Referring to FIG. 2, the mobile receiver 200 may include a microphone 201, an ADC 203, a processor 207, a memory 209, a storage device 211, a display unit 213, and a communication unit 215.

According to an exemplary embodiment, the microphone 201 may detect a sound outputted from the content playing device 100. That is, the microphone 201 may convert the sound into an electric signal.

According to an exemplary embodiment, the ADC 203 may convert the sound which is an analogue sound wave signal detected by the microphone 201 into digital data. In an exemplary embodiment, the ADC 203 may convert a sound wave signal within a predetermined frequency range or a maximum frequency range allowable by hardware, which is detected by the microphone, into digital data.

According to an alternative embodiment, the ADC 203 may convert the sound into the digital data only when the sound has an intensity greater than or equal to a predetermined threshold. In addition, the ADC 203 may convert the sound within the predetermined frequency range into the digital data only when the sound has an intensity greater than or equal to a predetermined threshold.

For example, the threshold may be a relative value such as a Signal to Noise Ratio (SNR) or an absolute value such as an intensity of a sound.

The processor 207 is a device which interprets a computer command and executes the command, and may be a central processing unit (CPU) of a general computer. The processor 207 may be an application processor (AP) in the case of a mobile device such as a smart phone, and may execute a program loaded into the memory 209.

The memory 209 may be implemented by using a volatile storage device such as a random access memory (RAM), and an operating system (OS) necessary for driving the mobile device 200, an application, data or the like may be loaded into the memory 209. The storage device 211 is a non-volatile storage device which stores data, and, for example, may be implemented by using a hard disk drive (HDD), a flash memory, a secure digital (SD) memory card, or the like.

The display unit 213 may display a content for the user as a voice, an image, and/or a fingerprint. For example, the display unit 213 may be implemented by using a display and a sound output terminal or a speaker connected thereto.

The communication unit 215 may be implemented by using a device for communicating with the outside. For example, the communication unit 215 may communicate with the server 100.

According to an exemplary embodiment, a related content providing application 223 may be loaded into the memory 209 and operated under the control of the processor 207. The related content providing application 223 may receive a sound using the microphone 201 and the ADC 203, and, when a sound wave ID is successfully extracted from the sound, transmits the extracted sound wave ID to the server 300 through the communication unit 215.

According to an exemplary embodiment, the related content providing application 223 may include, as an additional function, a function of determining whether the sound detected by the ADC 203 has an intensity greater than or equal to a threshold, and extracting a sound wave ID from the sound only when the sound has the intensity greater than or equal to the predetermined threshold value.

According to another exemplary embodiment, the related content providing application 223 may include, as an additional function, a function of determining whether the sound detected by the ADC 203 has an intensity greater than or equal to a threshold value within a predetermined frequency range, and extracting a sound wave ID from the detected sound only when the sound has the intensity greater than or equal to the predetermined threshold within the predetermined frequency range.

According to another exemplary embodiment, the operation of detecting and extracting the sound wave ID may be implemented by separate hardware rather than the related content providing application 223. That is, a sound wave ID extraction unit 205, which is illustrated by a dashed line in FIG. 2, is implemented as hardware, and the mobile receiver 200 may be configured to further include the sound wave ID extraction unit 205. In this case, the sound wave ID extraction unit 205 extracts the sound wave ID from the digital data converted by the ADC 203, and the related content providing application 223 transmits the sound wave ID extracted by the sound wave ID extraction unit 205 to the server 300 through the communication unit 215.

According to an exemplary embodiment of the present invention, at least one of the microphone 201, the ADC 203, the sound wave ID extraction unit 205, the display unit 213, the communication unit 215, and the related content providing application 223 may be activated to perform their respective operations after being in an inactivation state according to a schedule or when a predetermined event occurs.

For example, the microphone 201 and the ADC 203 may be activated to perform their respective operations according to a schedule or when a predetermined event occurs. In this example, the microphone 201 and the ADC 203 are elements which are activated after being in an inactivation state according to a schedule or when a predetermined event occurs.

For example, when the related content providing application 223 is implemented to have the function of determining whether the sound detected by the microphone 201 has the intensity greater than or equal to the threshold within the predetermined frequency range, the related content providing application 223 is activated to performs its own operation when the microphone 201 and the ADC 203 are activated.

For example, when the related content providing application 223 is implemented to have the function of extracting the sound wave ID, the related content providing application 223 is activated to perform its own operation when the microphone 201 and the ADC 203 are activated.

For example, in an embodiment in which the sound wave ID extraction function is performed by the sound wave ID extraction unit 205, the related content providing application 223 may be activated only when the sound wave ID is successfully extracted. The related content providing application 223 which is activated may transmit the extracted sound wave ID to the server 300, and receive a related content corresponding to the sound wave ID from the server 300 and display the related content through the display unit 213 as a voice and/or an image. Alternatively, the related content providing application 223 which is activated may search and select the related content corresponding to the extracted sound wave ID, and display the related content through the display unit 213 as a voice and/or an image. In this case, the related content database may be loaded into the memory 209, and the related content providing application 223 may scan the related content database and select the related content corresponding to the sound wave ID.

For example, the microphone 201 may be activated after being in an inactivation state according to a schedule or when an event occurs. When the microphone 201 detects a sound, for example, a sound belonging to a predetermined band, the other elements (for example, the ADC 203, the related content providing application 223, and the sound wave ID extraction unit 205) may be activated simultaneously or in sequence.

For example, when the sound is detected by the microphone 201, an element for determining whether the detected sound has an intensity greater than or equal to a predetermined threshold (for example, the related content providing application) may be activated. In addition, when the detected sound is determined to have the intensity greater than or equal to the predetermined threshold, an element for extracting the sound wave ID (for example, the sound wave ID extraction unit) may be activated.

The schedule will be described in detail in embodiments described with reference to FIG. 4. An operation of activating periodically or aperiodically according to a schedule will be described in embodiments described with reference to FIGS. 9 to 11, and an operation of activating when a predetermined event occurs will be described in embodiments described with reference to FIGS. 12 to 14.

For example, at least one of the microphone 201, the ADC 203, the sound wave ID extraction unit 205, the display unit 213, the communication unit 215, and the related content providing application 223 may be activated periodically or aperiodically after being in an inactivation state according to a schedule which is made with reference to a main content schedule. For example, at least one of the microphone 201, the ADC 203, the sound wave ID extraction unit 205, the display unit 213, the communication unit 215, and the related content providing application 223 may be activated in a predetermined period during the time that the main content is played. Alternatively, at least one of the microphone 201, the ADC 203, the sound wave ID extraction unit 205, the display unit 213, the communication unit 215, and the related content providing application 223 may be operated in a predetermined period during the time that the main content is played, and may be operated in a period which is longer than the predetermined period during the time that the main content is not played.

For example, at least one of the microphone 201, the ADC 203, the sound wave ID extraction unit 205, the display unit 213, the communication unit 215, and the related content providing application 223 may be activated periodically or aperiodically according to a schedule which is made with reference to a sound wave ID schedule. For example, the at least one element may be activated at the time when the sound wave ID is extractable.

For example, at least one of the microphone 201, the ADC 203, the sound wave ID extraction unit 205, the display unit 213, the communication unit 215, and the related content providing application 223 may be performed in a predetermined period, and, when the extraction of the sound wave ID fails but it is determined that there is the sound wave ID, may be activated in a period which is shorter than the predetermined period. Thereafter, when the ID is extracted, the at least one element is activated in the original period.

For example, at least one of the microphone 201, the ADC 203, the sound wave ID extraction unit 205, the display unit 213, the communication unit 215, and the related content providing application 223 may be performed in a predetermined period, and, when the following equation is satisfied, may be performed in a period which is shorter than the predetermined period:

Threshold>Intensity of detected sound>($\alpha$×threshold), (herein, $\alpha$ is smaller than 1).

That is, in an exemplary embodiment, when the intensity of the detected sound is smaller than the threshold but is close to the threshold, it is determined that there is likely to be the sound having the sound wave ID, and, when the above equation is satisfied, the at least one element is activated in a period which is shorter than the original period.

For example, at least one of the microphone 201, the ADC 203, the sound wave ID extraction unit 205, the display unit 213, the communication unit 215, and the related content providing application 223 may be activated when a predetermined event occurs. Herein, the event refers to a case in which a specific application is executed, a case in which the display unit of the mobile receiver 200 is activated or inactivated, or a case in which the mobile receiver 200 receives a push message from the outside.

Herein, the specific application may be an application which uses the microphone for its own use. However, this is merely an example and the specific application may be other applications.

For example, at least one of the microphone 201, the ADC 203, the sound wave ID extraction unit 205, the display unit 213, the communication unit 215, and the related content providing application 223 may be performed in a predetermined period, and, when the predetermined event occurs, may not be performed. In addition, when the predetermined event is finished, the at least one element is activated according to the original period.

For example, when the predetermined event occurs, the processor 207 may deliver occurrence of the event to an operating system (OS) (not shown) of the mobile receiver 200 (which may be loaded into the memory 209), and the OS may deliver the occurrence of the event to filters (not shown) (which may be loaded into the memory 209) provided to correspond to respective applications operating in the mobile receiver 200. The filters may deliver or not deliver the occurrence of the event to the applications corresponding thereto according to predetermined settings. These operations will be described in detail in the embodiments described with reference to FIG. 14.

Figure 3:
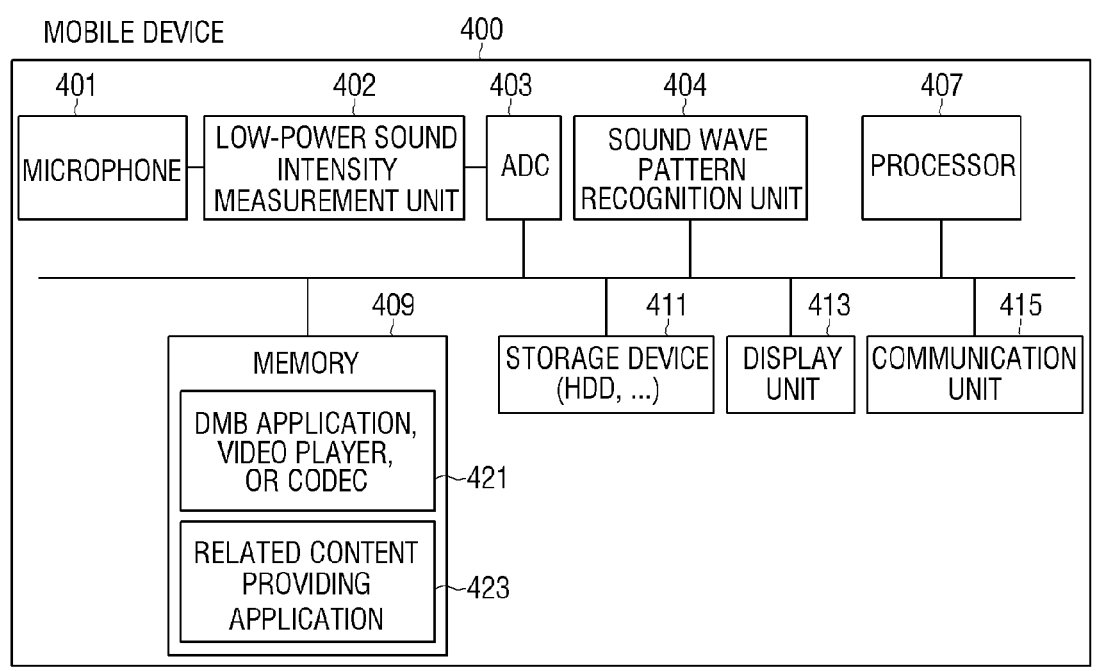
FIG. 3 is a view to illustrate another embodiment of the mobile receiver.

FIG. 3 is a view to illustrate another embodiment of the mobile receiver.

Referring to FIG. 3, the mobile receiver 400 may include a microphone 401, a low-power sound intensity measurement unit 402, an ADC 403, a sound wave pattern recognition unit 404, a processor 407, a memory 409, a storage device 411, a display unit 413, and a communication unit 415.

Comparing the embodiment of FIG. 3 and the embodiment of FIG. 2, it can be seen that the sound wave ID extraction unit 205 of FIG. 2 is divided into the low-power sound intensity measurement unit 402 and the sound wave pattern recognition unit 404.

According to an exemplary embodiment, at least one of the microphone 401, the low-power sound intensity measurement unit 402, the ADC 403, the sound wave pattern recognition unit 404, and the related content providing application 423 may be activated according to a schedule or may be activated when a predetermined event occurs. The schedule may be made to activate the element periodically or aperiodically. The schedule will be described in detail in the embodiments described with reference to FIG. 4. An operation of activating periodically or aperiodically according to a schedule will be described in the embodiments described with reference to FIGS. 9 to 11, and an operation of activating when a predetermined event occurs will be described in the embodiments described with reference to FIGS. 12 to 14.

For example, the microphone 401, the low-power sound intensity measurement unit 402, and the ADC 403 may be activated to perform their own operations according to a schedule or when a predetermined event occurs. In this example, the microphone 401, the low-power sound intensity measurement unit 402, and the ADC 403 are elements which are activated after being in an inactivation state according to a schedule or when a predetermined event occurs.

For example, the microphone 401, the low-power sound intensity measurement unit 402, the ADC 403, and the sound wave pattern recognition unit 404 may be activated to perform their own operations according to a schedule or when a predetermined event occurs.

For example, the related content providing application 423 may be activated only when a sound wave ID is successfully extracted. The related content providing application 423 which is activated may transmit the extracted sound wave ID to the server 300, and receive a related content corresponding to the sound wave ID from the server 300 and display the related content through the display unit 413 as a voice and/or an image. Alternatively, the related content providing application 423 which is activated may search and select a related content corresponding to the sound wave ID, and display the related content through the display unit 413 as a voice and/or an image. In this case, a related content database may be loaded into the memory 409, and the related content providing application 423 may scan the related content database and select the related content corresponding to the sound wave ID.

For example, the microphone 401 may be activated after being in an inactivation state according to a schedule or when an event occurs, and, when the microphone 401 detects a sound (for example, a sound belonging to a predetermined band), the other elements (for example, the ADC 403, the related content providing application 423, the low-power sound intensity measurement unit 402, or the sound wave pattern recognition unit 401) may be activated simultaneously or in sequence.

For example, when a sound is detected by the microphone 401, the low-power sound intensity measurement unit to determine whether the detected sound has an intensity greater than or equal to a predetermined threshold may be activated. In addition, when it is determined that the detected sound has the intensity greater than or equal to the predetermined threshold, the sound wave pattern recognition unit 404 to extract a sound wave ID may be activated.

For example, at least one of the microphone 401, the low-power sound intensity measurement unit 402, the ADC 403, the sound wave pattern recognition unit 404, and the related content providing application 423 may be activated periodically or aperiodically after being in an inactivation state according to a schedule which is made with reference to a main content schedule. For example, at least one of the microphone 401, the low-power sound intensity measurement unit 402, the ADC 403, the sound wave pattern recognition unit 404, and the related content providing application 423 may be activated in a predetermined period during the time that the main content is played. Alternatively, at least one of the microphone 401, the low-power sound intensity measurement unit 402, the ADC 403, the sound wave pattern recognition unit 404, and the related content providing application 423 may be operated in a predetermined period during the time that the main content is played, and may be operated in a period which is longer than the original period during the time that the main content is not played.

For example, at least one of the microphone 401, the low-power sound intensity measurement unit 402, the ADC 403, the sound wave pattern recognition unit 404, and the related content providing application 423 may be activated periodically or aperiodically according to a schedule which is made with reference to a sound wave ID schedule. For example, the at least one element may be activated at the time when the sound wave ID can be extracted.

For example, at least one of the microphone 401, the low-power sound intensity measurement unit 402, the ADC 403, the sound wave pattern recognition unit 404, and the related content providing application 423 may be activated in a predetermined period, and, when the extraction of the sound wave ID fails but it is determined that there is the sound wave ID, the at least one element may be activated in a period which is shorter than the original period. Thereafter, when the ID is extracted, the at least one element may be operated in the original period.

For example, at least one of the microphone 401, the low-power sound intensity measurement unit 402, the ADC 403, the sound wave pattern recognition unit 404, and the related content providing application 423 may be operated in a predetermined period, and, when the following equation is satisfied, may be operated in a period which is shorter than the predetermined period:

Threshold>Intensity of detected sound>(α×threshold), (herein, α is smaller than 1)

That is, when the intensity of the detected sound is smaller than the threshold but is close to the threshold, it is determined that there is likely to be the sound having the sound wave ID, and, when the above equation is satisfied, the above-described elements may be activated in a period which is shorter than the original period.

For example, at least one of the microphone 401, the low-power sound intensity measurement unit 402, the ADC 403, the sound wave pattern recognition unit 404, and the related content providing application 423 may be activated when a predetermined event occurs. Herein, the event may refer to a case in which a specific application is executed, a case in which the display unit of the mobile receiver 200 is activated or inactivated, or a case in which the mobile receiver 200 receives a push message from the outside.

Herein, the specific application may be an application which uses a microphone for its own use. However, this is merely an example and the specific application may correspond to other applications.

For example, at least one of the microphone 401, the low-power sound intensity measurement unit 402, the ADC 403, the sound wave pattern recognition unit 404, and the related content providing application 423 may be operated in a predetermined period, and may not be operated when the predetermined event occurs. In addition, when the predetermined event is finished, the at least one element may be activated according to the original period.

For example, when the predetermined event occurs, the processor 407 may deliver occurrence of the event to an operating system (OS) (not shown) of the mobile receiver 400 (which may be loaded into the memory 409), and the OS may deliver the occurrence of the event to filters (not shown) (which may be loaded into the memory 409) provided to correspond to respective applications operating in the mobile receiver 400. The filters may deliver or not deliver the occurrence of the event to the applications corresponding thereto according to predetermined settings. These operations will be described in detail in the embodiments described with reference to FIG. 14.

According to an exemplary embodiment, the low-power sound intensity measurement unit 402 may consume low power, but may be continuously activated, and the sound wave pattern recognition unit 404 may consume more power than the low-power sound intensity measurement unit 402, but may be frequently inactivated and may be activated according to a schedule or when a predetermined event occur (that is, intermittently activated). The low-power sound intensity measurement unit 402 may detect a sound within a predetermined frequency range, and continuously determine whether the intensity of the detected sound is greater than or equal to a predetermined threshold.

In an embodiment, the low-power sound intensity measurement unit 402 may determine whether the sound inputted through the microphone 401 has an intensity greater than or equal to a predetermined threshold within a predetermined frequency range. When the intensity is greater than or equal to the threshold, the low-power sound intensity measurement unit 402 may activate the ADC 403 and the sound wave pattern recognition unit 404 which have been inactivated for a low-power operation. In this case, the activated ADC 403 may convert the sound into digital data and transmit the digital data to the activated sound wave pattern recognition unit 404.

According to an exemplary embodiment, the sound wave pattern recognition unit 404 may receive the sound in the digital data form from the ADC 403, and may extract a sound wave ID from the received sound when the sound wave ID is included in the sound. In this case, when the processor 407 is inactivated to operate at low power, the sound wave pattern recognition unit 404 may activate the processor 407. In an exemplary embodiment, the sound wave pattern recognition unit 404 may provide the extracted sound wave ID to the related content providing application 423.

According to another exemplary embodiment, the sound wave pattern recognition unit 404 may receive the sound wave in the digital data form from the ADC 403, determine whether it is possible to extract a sound wave ID from the sound received from the ADC 403 by comparing the received sound wave and at least one pre-stored sound wave ID, and, when it is determined that it is possible to extract the sound wave ID, directly extract the sound wave ID. According to an alternative embodiment, the sound wave pattern recognition unit 404 may determine whether it is possible to extract the sound wave ID from the sound received from the ADC 403, and, when it is determined that it is possible to extract the sound wave ID, provide the sound received from the ADC 403 to the related content providing application 423, and the related content providing application 423 may extract the sound wave ID.

A technique of implementing the operation of detecting and extracting the sound wave ID by using separate hardware may use technologies disclosed in the patent documents presented below.

For example, a technique of extracting a sound wave which is modulated to a non-audible sound at low power may use technology disclosed in Korean Patent Application No. 10-2013-0141504, filed on Nov. 20, 2013, by the same inventor as the present application with the KIPO (titled "Method for Receiving Low-Power Sound Wave and Mobile Device Using the Same").

The technologies disclosed in the specification of Korean Patent Application No. 10-2013-0141504 are incorporated into the specification of the present application and are dealt with as a part of the specification of the present application.

A DMB application or a video player which is operated under the control of the processor 407, or a codec 221 necessary for playing a content through the DMB application or the video player may be loaded into the memory 409. The DMB application, the video player, or the codec 221 may be stored in the storage device 411, and may be loaded into the memory 409 and operated according to a user's command. In addition, although not shown in the drawings, when a message is received from the server 300, a message processing program (not shown) may be loaded into the memory 409 and display the message through the display unit 413.

Elements which are not described in the embodiment of FIG. 3 perform the same or similar operations as the operations of the elements given similar reference numerals in the embodiment of FIG. 2, so please refer to the description of the embodiment of FIG. 2.

Extraction of Low-Power Sound Wave ID

The term "sound recognition module" used in the specification of the present application refers to at least one of the microphone, the ADC, the sound wave ID extraction unit, the related content providing application, the low-power sound intensity measurement unit, and the sound wave pattern recognition unit which are included in the mobile receiver for the purpose of describing the present invention, and the at least one element may detect or detect a sound wave ID or activate an element for detecting or extracting the sound wave ID.

According to an exemplary embodiment of the present invention, the sound recognition module may be activated according to a schedule or when a predetermined event occurs (or intermittently), so that the sound recognition module can be operated at low power. When the sound recognition module is activated, the sound recognition module may detect a sound and detect or extract a sound ID. In this case, the activation may refer to performing overall operations, such as executing a necessary hardware module, executing necessary software, or requesting necessary input information from an operating system, in order to switch from a state in which the sound recognition module performs a minimum function to minimize power consumption to a state in which the sound recognition module can detect and extract the sound wave ID.

The intermittent activation to operate at low power is illustrated in the embodiments of FIGS. 9 to 14.

Figure 9:
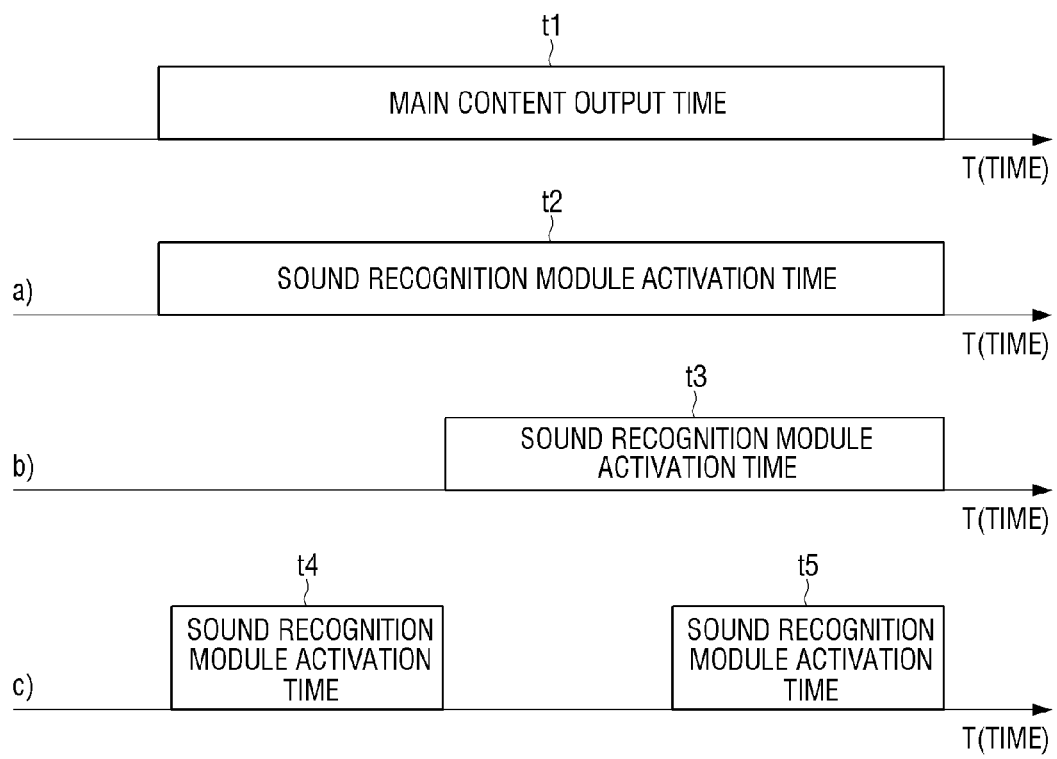
FIG. 9 is a view to illustrate a sound recognition module which is activated according to a predetermined period to operate at low power.
Figure 10:
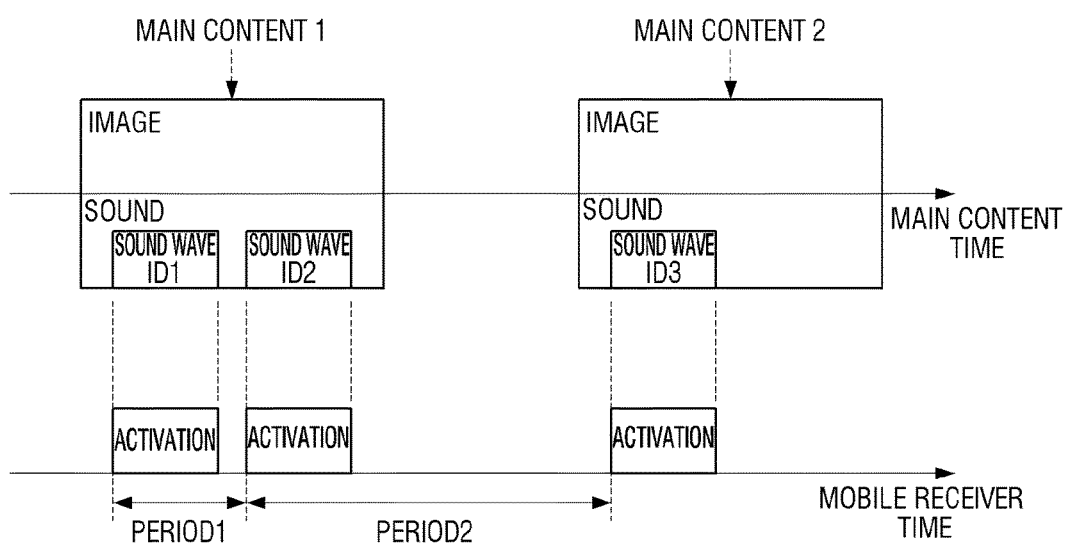
FIG. 10 is a view to illustrate the sound recognition module which is activated according to time at which a sound wave ID is extractable during the time that a main content is broadcasted and played.
Figure 11:
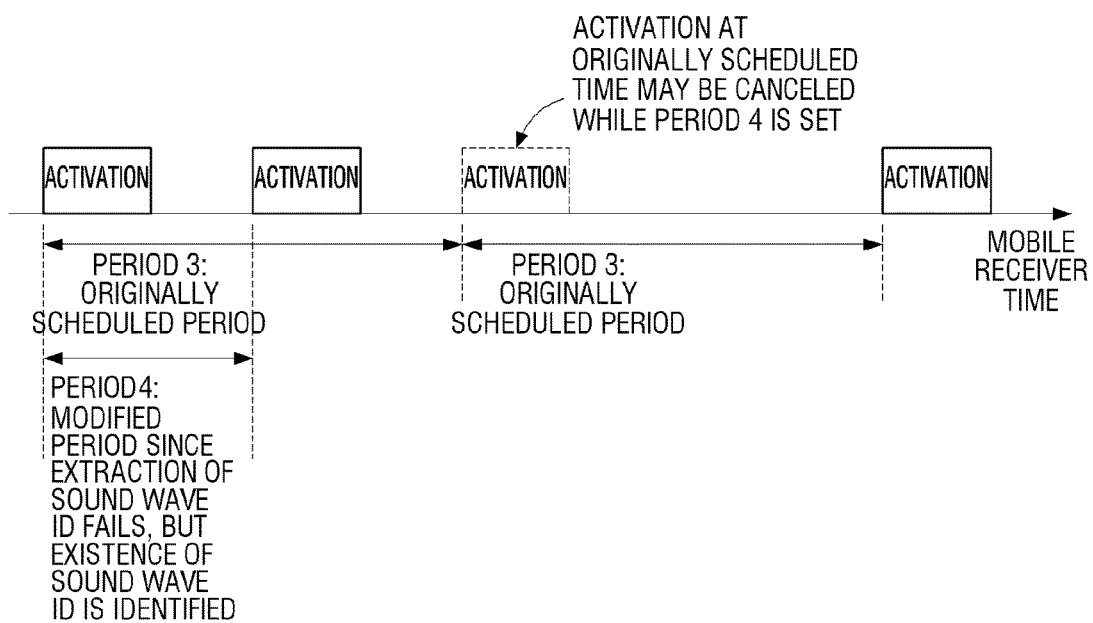
FIG. 11 is a view to illustrate an activation period of the sound recognition module when the existence of a sound wave ID is estimated by more than a predetermined probability through a sound wave ID extracting process.
Figure 12:
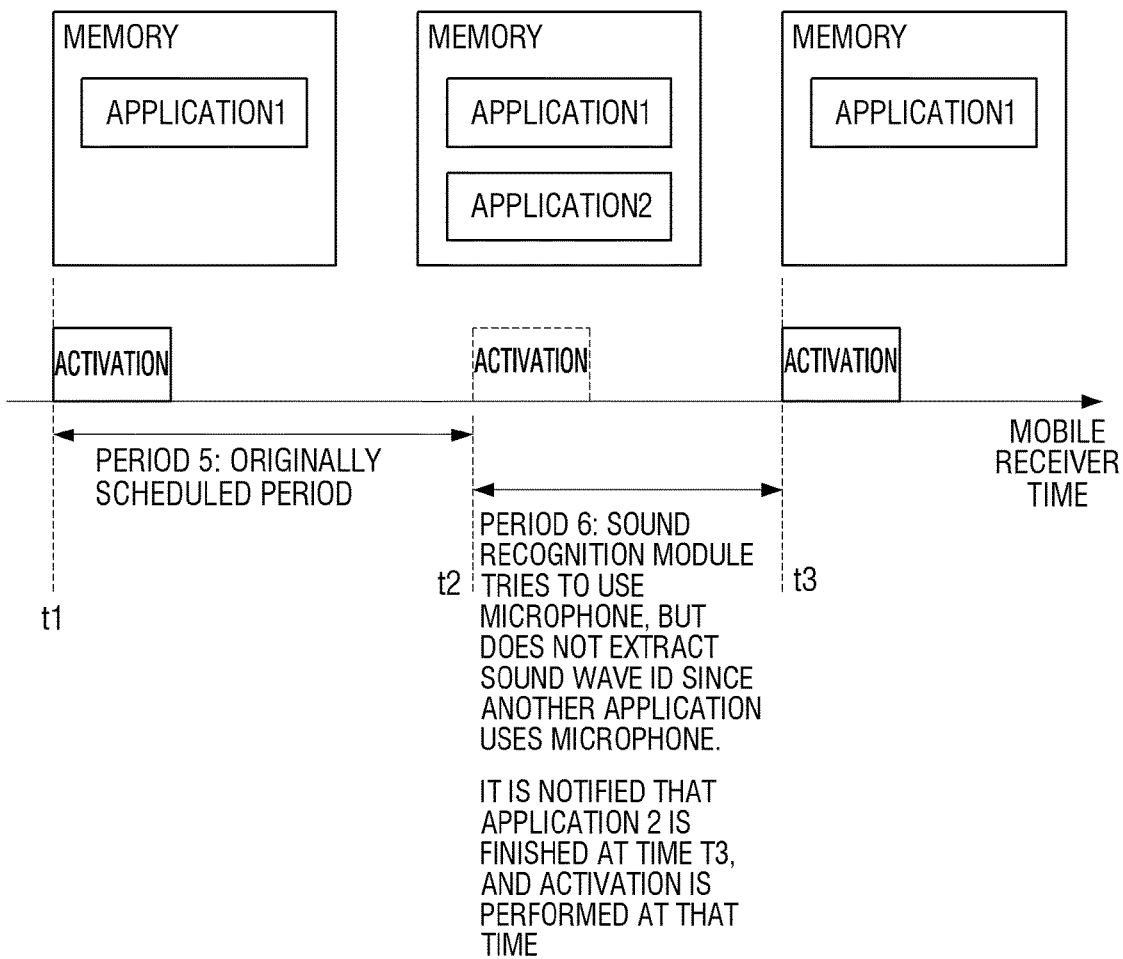
FIG. 12 is a view to illustrate adjusting the period of the sound recognition module according to an event in which another application using a microphone which is a shared resource in the mobile receiver is activated.
Figure 13:
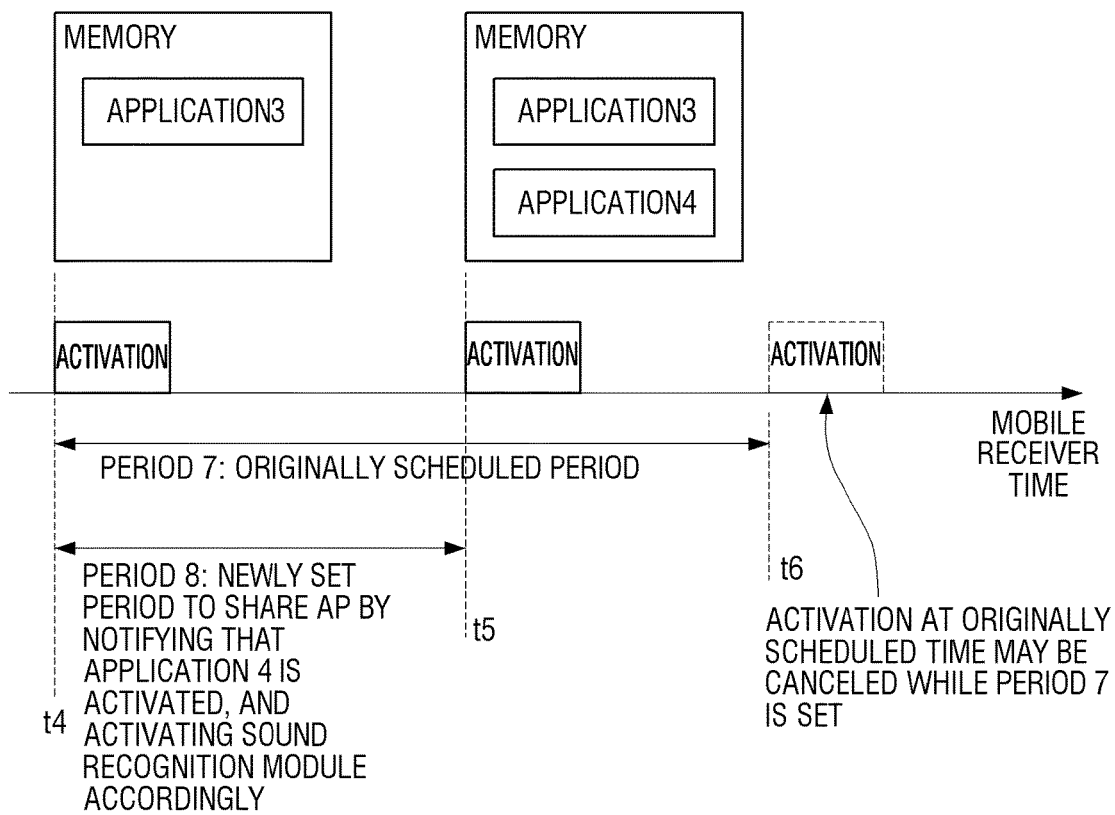
FIG. 13 is a view to illustrate adjusting the period of the sound recognition module according to an event in which another application using a microphone which is a shared resource in the mobile receiver is activated.

The intermittent activation to operate at low power may indicate (A) a state in which the sound recognition module is activated and operated for a period of 10 minutes, which is illustrated in FIG. 9. In another example, the intermittent activation may indicate (B) a state in which the sound recognition module is activated and operated aperiodically by utilizing a time characteristic for extracting a sound wave ID from a main content or in consideration of a broadcasting time of a main content including a sound wave ID to be extracted, which is illustrated in FIG. 10. In another example, the intermittent activation may indicate (C) a state in which the sound recognition module is activated and operated aperiodically in consideration of a result of trying to receive a sound wave ID in a previous period, which is illustrated in FIG. 11. In another example, the intermittent activation may indicate (D) a state in which the sound recognition module is activated and operated aperiodically according to an event which occurs in the mobile receiver, which is illustrated in FIGS. 12 to 14. FIG. 14 illustrates how an event occurring in the mobile receiver is delivered to the sound recognition module.

(A) Periodic Activation

FIG. 9 is a view to illustrate that the sound recognition module is activated according to a predetermined period to operate at low power.

View (a) of FIG. 9 illustrates that the sound recognition module is activated for the same time as the time that a main content is outputted. View (b) of FIG. 9 illustrates that the sound recognition module is activated at time corresponding to the latter half of the output time of the main content or at time when the main content is finished. View (c) of FIG. 9 illustrates that the sound recognition module is activated multiple times (for example, two times) at predetermined intervals during the output time of the main content.

(B) Activation According to a Broadcasting Time of a Content and a Time at which a Sound Wave ID is Extractable.

FIG. 10 is a view to illustrate that the sound recognition module is activated according to time at which a sound wave ID is extractable during the time that the main content is broadcasted and played.

According to an exemplary embodiment, when the sound recognition module is periodically activated, the activation period may be determined in consideration of a time location of a sound wave ID which is extracted from a main content outputted by the content playing device 100, and continuity of the extractable sound wave ID. For example, it may be assumed that a content having a pattern of total 4 minutes, in which the sound wave ID in the content can be continuously and repeatedly extracted for the first 2 minutes but cannot be extracted for the second 2 minutes, is outputted continuously. In this example, when the sound recognition module recognizes whether it is possible to extract the sound wave ID on a basis of at most 2 minutes, the sound recognition module can extract the sound wave ID from the content within short time and also can intermittently try to extract the sound wave ID, so that power consumption which is caused by the extraction of the sound wave ID can be reduced.

According to another exemplary embodiment, when the broadcasting date and time of a content outputted from the content playing device 100 can be known in advance, the sound recognition module may be activated for a shorter period at the corresponding time that the content is broadcasted. For example, it is assumed that the period of the sound recognition module is set to 10 minutes. In this case, when a specific content of a TV is scheduled to be aired at 6 p.m. on every Saturday for one hour, and it is possible to extract a sound wave ID from the content, the sound recognition module may be operated in a period of 5 minutes rather than 10 minutes from 6 p.m. until 7 p.m. on every Saturday. In addition, the sound recognition module which has been continuously inactivated may be activated for only 1 hour from 6 p.m. until 7 p.m. on every Saturday.

The two exemplary embodiments described above will be described with reference to FIG. 10. The mobile receiver 200 or 400 may know the time at which the sound wave ID can be extracted, that is, the playing time of sound waves ID1, ID2, and ID3. Information on the time may be received by the sound recognition module of the mobile receiver 200 or 400 through the server. When the time to reproduce sound wave ID1 arrives, the sound recognition module may be activated to extract sound wave ID1. In this case, when the sound recognition module fails to extract sound wave ID1, the sound recognition module may determine that the user of the mobile receiver 200 or 400 neither views nor listens main content 1. When the sound recognition module succeeds in extracting sound wave ID1, the mobile receiver 200 or 400 may receive a related content corresponding to sound wave ID1 from the server 300 and display the related content. Likewise, the sound recognition module is activated according to the playing time of sound waves ID2 and ID3 and extracts the sound wave ID, and, when the sound recognition module succeeds in executing the sound wave ID, the mobile receiver 200 or 400 may receive a related content corresponding to the sound wave ID from the server 300, and display the related content. In this way, the mobile receiver 200 or 400 may aperiodically activate the sound recognition module only at the time at which the sound recognition module is expected to extract the sound wave ID, so that the mobile receiver 200 or 400 can extract the sound wave ID and display the related content at low power.

(C) Activation According to a Result of Extracting a Previous Sound Wave ID

FIG. 11 is a view to illustrate an activation period of the sound recognition module when the existence of a sound wave ID is estimated with a predetermined probability or more through a sound wave ID extraction process.

Referring to FIG. 11, the sound recognition module of the mobile receiver 200 or 400 may be activated according to an originally scheduled period. In this case, it may be determined that it is possible to extract a sound wave ID (hereinafter, referred to as "determining the existence/absence of a sound wave ID"), but the sound recognition module may fail to extract. That is, for example, when a hamming distance between the extracted sound wave ID and a specific sound wave ID existing in the related content DB is less than or equal to a predetermined value, the sound recognition module may fail to extract the sound wave ID, but may estimate that there is the sound wave ID. In addition, the sound wave ID may include cyclic redundant check (CRC) information for determining the presence/absence of the sound wave ID and determining a failure to extract, and thus the presence/absence of the sound wave ID may be determined based on the CRC information. In addition, in order to determine the existence/absence of the sound wave ID, the sound recognition module may measure a Signal-to-Noise Ratio (SNR). When the SNR is greater than or equal to a predetermined threshold, it may be estimated that there is the sound wave ID. It is assumed that the sound wave ID is determined as existing in the above-described way, but the extraction of the sound wave ID fails. In this case, in order not to miss the time that the sound wave ID can be extracted, the sound recognition module may cancel the activation of the sound recognition module which is scheduled to be performed after period 3, which is an originally schedule period, and may be activated in period 4 which is shorter than period 3, and the period after period 4 may be adjusted according to the original period. By doing so, the time zone when the sound wave ID can be extracted from the main content may not be missed. Therefore, by adjusting the period based on the result of the trial to extract the sound wave ID, the probability that the sound wave ID is extracted increases and also, the existing frequency of activation can be maintained as it is, so that the mobile receiver can be operated at low power.

(D) Activation According to an Internal Event of a Mobile Receiver

According to an exemplary embodiment, the sound recognition module may be activated and operated aperiodically according to an event which occurs in the mobile receiver 200 or 400. This will be described below with reference to FIGS. 12 and 13.

FIG. 12 is a view to illustrate adjusting the period of the sound recognition module according to an event in which another application using the microphone 201 or 401, which is a common resource in the mobile receiver 200 or 400, is activated.

Various applications may be operated on the mobile receiver 200 or 400 simultaneously. In this case, the microphone 201 or 401 which is a part of the mobile receiver 200 or 400 is a resource which is shared by various applications, and may be shared in a First-Come First-Served (FCFS) method, that is, in such a manner that another application cannot use the microphone 201 until an application using the microphone 201 first is stopped. In this case, the sound recognition module which is intermittently activated may prevent another application from using the microphone 201 or 401 even when the application tries to use the microphone 201 or 401. Therefore, when an application which is able to use the microphone 201 or 401 is detected or when the sound recognition module fails to try to use the microphone 201 or 401, the sound recognition module may defer being activated until the application is finished, and thus may not interfere with the operation of another application using the microphone 201 or 401 and also may reduce the total number of activations, so that the mobile receiver can be operated at low power.

For example, application 1 included in the sound recognition module may be loaded into the memory 209 or 409 of the mobile receiver 200 or 400 at time t1 as shown in FIG. 12. The sound recognition module is scheduled to be activated according to predetermined period 5, but may be notified that application 2 which is highly likely to use the microphone 201 or 401 is executed before time t2, or may obtain information on a currently executed application from an operating system prior to extracting the sound wave ID at time t2, thereby detecting application 2 (the method for detecting or receiving a notification in this case will be described in detail with reference to FIG. 14). When application 2 is executed, the sound recognition module may cancel the activation which is scheduled to be performed at time t2, and newly set a next activation period after time t2. The newly set period may be a period which starts from time which elapses from time t1 two times longer than period 5 to activate the sound recognition module. In addition, as shown in FIG. 12, the newly set period may be a period which is adjusted such that the sound recognition module is activated at time t3 at which the sound recognition module is notified of the end of application 2, and may be modified at a time when application 2 notifies to the sound recognition module.

In another example, when a camera application is activated, the application may exclusively use a part of the sound recognition module to make a video. In this case, the sound recognition module may stop periodic activation so that the camera application can exclusively use a part of the sound recognition module, and may be activated when the cameral application is finished.

FIG. 13 is a view to illustrate adjusting the period of the sound recognition module according to an event in which another application using the microphone 201 or 401 which is a common resource in the mobile receiver 200 or 400 is activated.

It is assumed that the sound recognition module of the mobile receiver 200 or 400 is activated at time t4 and tries to extract a sound wave ID. An originally scheduled period is period 7 and the sound recognition module may be scheduled to be activated again at time t6. However, the operating system may notify the sound recognition module that application 4 using the microphone 201 or 401 is executed at time t5 (the method for detecting or receiving a notification will be described in detail with reference to FIG. 14). When the operating system allows the microphone 201 or 401 to be shared, the sound recognition module which is notified of the execution of application 4 may share hardware and software resources which are used by application 4 and are necessary for extracting the sound wave ID, such as the microphone 201 or 401, the ADC 203 or 403, the processor 207 or 407, or the like. For example, the operating system may transmit digital data which is converted from the sound entering through the microphone 201 or 401 through the ADC 203 or 403 to the sound recognition module as well as application 4, simultaneously, so that data related to the sound can be received at both the sound recognition module and application 4. By being supported by the operating system in this way, the sound recognition module can extract the sound wave ID at lower power in view of the total power consumption of the mobile receiver 200 or 400, in comparison to a case in which the sound recognition module is individually activated and tries to extract the sound wave ID. In addition, when the activation is performed in this way, the activation which is scheduled to be performed at time t6 is canceled, so that the sound recognition module can be operated at low power.

For example, when a telephone application is activated, this application normally uses the microphone 201 or 401 and the ADC 203 or 403 and activates the processor 207 or 407. Therefore, when the sound recognition module is activated simultaneously, it is possible to extract a sound wave ID at low power. In another example, when a video player, a DMB application, or a codec 221 or 421 is operated, the mobile receiver 200 or 400 may be deemed to serve as a content playing device and thus the sound recognition module may be activated to provide a related content.

In FIGS. 12 and 13, the sound recognition module has been illustrated as being able to estimate whether a specific application will uses the microphone 201 or 401. The sound recognition module may estimate by reading information on permission that each application receives from the operating system to use hardware. The sound recognition module may request a list of applications which are being executed from the operating system, and obtain the list.

In FIGS. 12 and 13, the sound recognition module has been illustrated as being operated aperiodically according to the event in the mobile receiver in which a specific application is executed or finished. However, the event is not limited to the above-described types of events. For example, the event described in FIGS. 12 and 13 may be an event in which the application switches from a background mode to a foreground mode or switches from the foreground mode to the background mode, as well as the event in which a specific application is executed or finished. In another example, the event of FIG. 12 may be an event in which one or more of the internal elements of the mobile receiver 200 or 400 rather than a specific application are activated, and the event of FIG. 13 may be an event in which the one or more of the elements are inactivated. Specifically, the event may be an event in which the display of the display unit is activated or inactivated. In another example, the event may be an event in which the mobile receiver 200 or 400 receives a push message from a push server.

FIG. 14 is a view to illustrate methods for the mobile receiver 200 or 400 to be notified of an event in order to operate the sound recognition module at low power as shown in FIGS. 12 and 13.

Figure 14A:
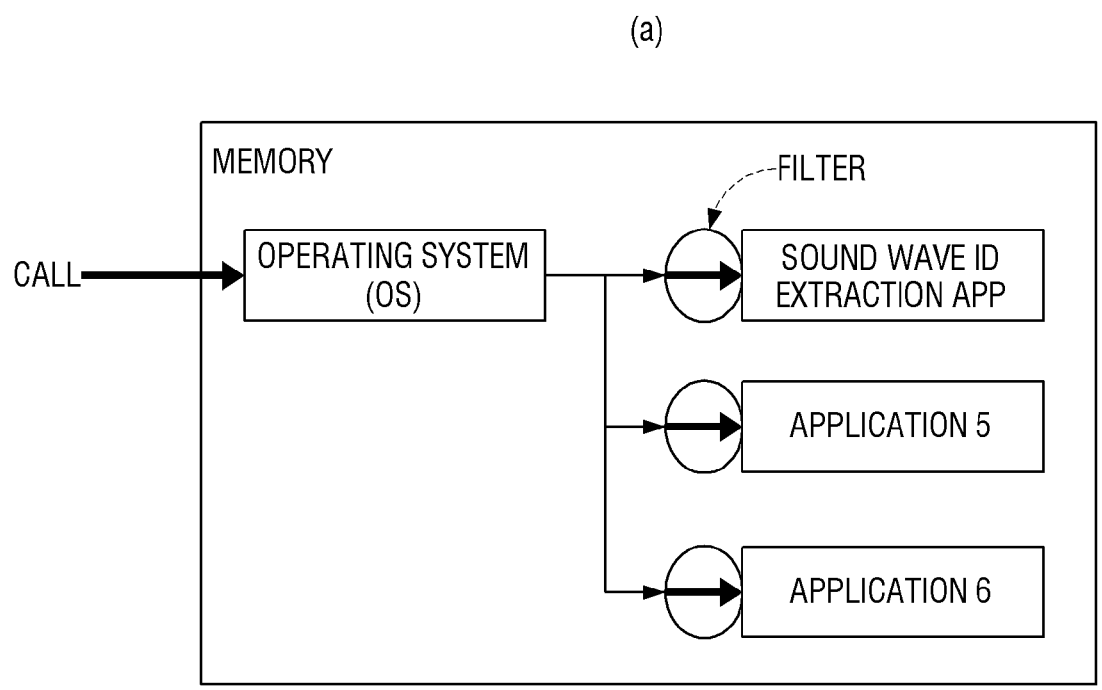
FIG. 14 is a view to illustrate methods for receiving a notification of an event of the mobile receiver in order for the sound recognition module to operate at low power.
Figure 14B:
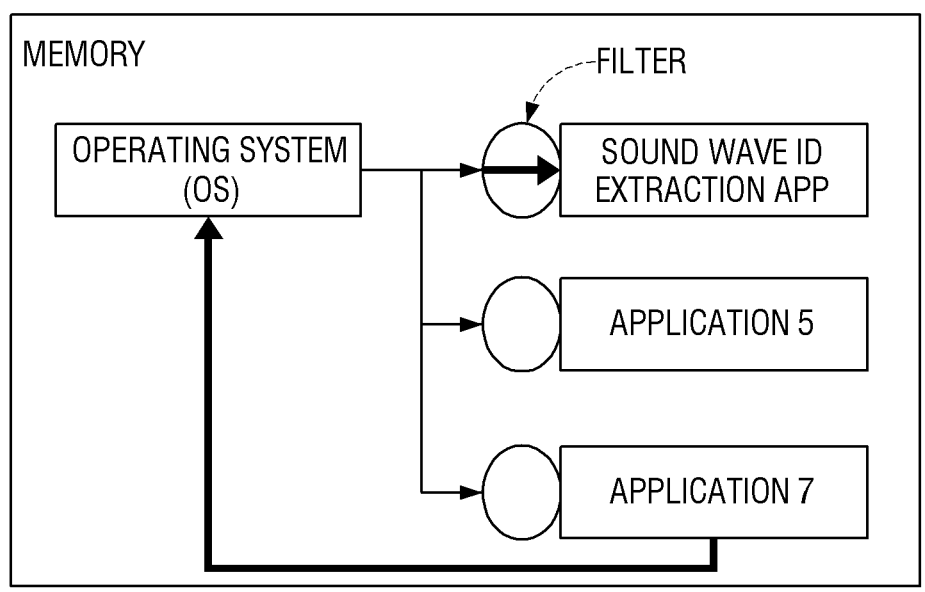
Figure 14C:
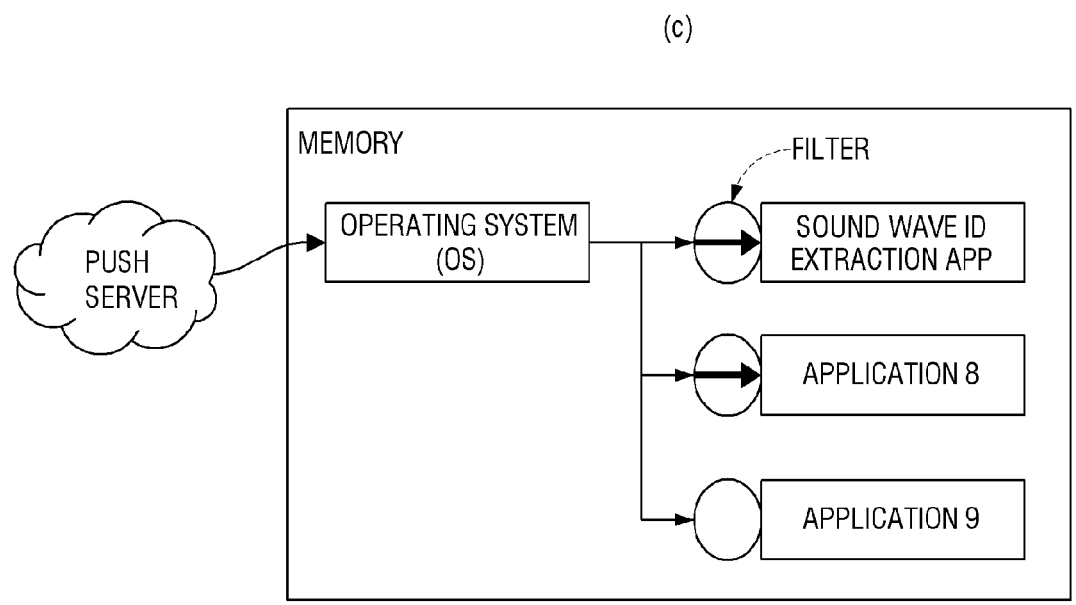

FIG. 14A illustrates a method for receiving a notification when the operating system informs applications which are being executed that a specific event occurs. FIG. 14B illustrates a method in which a specific application notifies an application corresponding to the sound recognition module that an event occurs. FIG. 14C illustrates a method for the sound recognition module to receive a notification when a push server which receives a message from a server at low power transmits the message.

The case of FIG. 14A will be described by way of an example.

The mobile receiver 200 or 400 may include a function of receiving a phone call. In this case, when a phone call comes in, the operating system may operate an application to receive the phone call, and deliver a phone call reception event to filters of respective applications so that the other applications respond to the calling event. For example, application 5 may be an application for processing phone call reception and application 6 may be an application which is playing back music. When the phone call comes in, the operating system delivers the calling event to the filters of the applications. Since application 6 should stop playing back the music when the phone call comes in, the filter of application 6 may be set to pass the call reception event. Since the filter of application 5 should prepare a user interface and make it possible to receive the phone call when the phone call comes in, application 5 may be set to pass the call reception event. It is assumed that the operating system can deliver digital data which is inputted through the microphone 201 or 401 and inputted through the ADC 203 or 403 to various applications simultaneously. In this case, the sound recognition module may receive sound digital data and extract the sound wave ID. Therefore, an application corresponding to the application of the sound recognition module may set its own filter to pass the phone call reception event. To be brief, the event necessary for operating at low power from among the events transmitted by the operating system is set to pass through the filter, so that the sound recognition module can extract the sound wave ID at low power.

The case of FIG. 14B will be explained by way of an example.

When application 2 of FIG. 12 and application 4 of FIG. 13 notify the sound recognition module of the activation and end of the applications, the sound recognition module may be operated at low power. It is assumed that application 7 of FIG. 14B is application 2 of FIG. 12 or application 4 of FIG. 13. In this case, application 7 may deliver an event to be delivered to other applications to the operating system. The event may be the activation event of application 2 of FIG. 12 or the end event of application 4 of FIG. 13. The corresponding event may be delivered to the operating system and the operating system may deliver the event to the filters of all of the applications. In this case, the filter of the application included in the sound recognition module may be set to pass the activation event or the end event. In this way, the sound recognition module may be notified of the activation or end of a specific application. In another example, the sound recognition module may be notified of use or end of use of hardware or software to be used, rather than the activation or end of the application, as an event.

The case of FIG. 14B will be described in detail with another example.

The broadcasting or playing schedule of main content 1 and main content 2 of FIG. 10 may be known in advance. In this case, application 7 of FIG. 14B may be the same application as a sound wave ID extraction application. The sound wave ID extraction application may receive the broadcasting and playing schedule of main contents 1 and 2 from the server, and register corresponding time as an alarm of the operating system. When the corresponding time arrives, the registered alarm may transmit a registered event to the filters of the applications. Since application 5 functions regardless of the alarm event, the filter of application 5 does not deliver this event to application 5. However, the filter of the application included in the sound recognition module (the filter of the sound wave ID extraction application of FIG. 14B) may receive the alarm event and start extracting the sound wave ID. In the same way, time at which the sound wave IDs of main contents 1 and 2 end is registered as an alarm of the operating system, and the application included in the sound recognition module may finish extracting the sound wave ID.

The case of FIG. 14C will be described by way of an example.

In FIG. 14C, the mobile receiver 200 or 400 may receive a message from a push server and delivers the message to an application through the operating system. It is assumed that the application which receives the push message is application 8. Specifically, it is assumed that application 8 is an MIM service. In this case, the mobile receiver 200 or 400 may receive the push message from the server and deliver the push message to the operating system, and the operating system may transmit the push message to the filters of applications. The filter of application 8 may be set to pass the push message to perform the MIM function. Application 9 is operated regardless of the corresponding push message and the filter of application 9 may be set not to pass the push message. The mobile receiver 200 or 400 may receive the push message in the middle of activating only minimum hardware and software to receive the push message in order to operate while reducing power consumption. In this case, the MIM service which receives the push message from the operating system may perform an operation suitable for the push message. The filter of the application of the sound recognition module may be set to pass the push message. In this case, the sound recognition module may be activated to process the push message when various elements of the mobile receiver 200 or 400, such as the AP, the display, or the like, are activated, and may share hardware and software needed by the sound recognition module from among the elements of the mobile receiver 200 or 400 with application 8. By sharing the hardware and software, the sound recognition module may be operated at low power in view of the entire mobile receiver 200 or 400.

Figure 4:
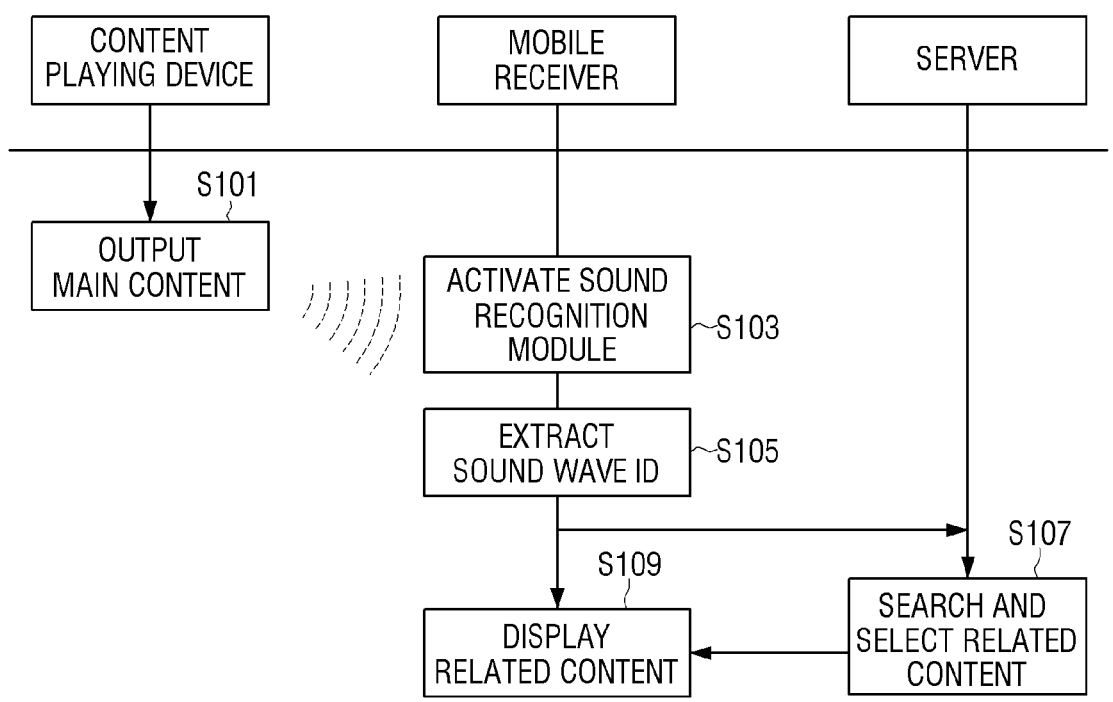
FIG. 4 is a view to illustrate a related content providing method according to an exemplary embodiment of the present invention.

Method for Providing a Related Content Based on a Related Content DB of the Server FIG. 4 is a view to illustrate a method for providing a related content according to an exemplary embodiment of the present disclosure.

On the assumption that the method for providing the related content according to an exemplary embodiment is applied to the system of FIG. 1, the embodiment of FIG. 4 will be explained.

The method for providing the related content according to an exemplary embodiment may include the steps of: outputting, by the content playing device 100, a main content (S101); activating the sound recognition module of the mobile receiver (S103); extracting a sound wave ID (S105); receiving, by the server 300, the sound wave ID extracted in step S105, and searching and selecting a related content corresponding to the sound wave ID (S107); and displaying, by the mobile receiver 200, the related content selected in step S107 (S109).

In step 103, the sound recognition module may be activated according to a schedule or may be activated when a predetermined event occurs. The schedule may be made to activate the sound recognition module periodically and/or aperiodically. For example, the schedule may be made with reference to a main content schedule (a schedule indicating times at which a main content is played), or a sound wave ID schedule (a schedule indicating times at which the sound wave ID can be extracted, but this is merely an example. The schedule may not necessarily be made with reference to the main content schedule or the sound wave ID schedule.

According to an exemplary embodiment, the schedule may be made to activate the sound recognition module periodically or may be made to activate the sound recognition module aperiodically. Examples of the sound recognition module activated according to a schedule have been illustrated in the embodiments described with reference to FIGS. 9 to 11, but it would be easily understood that the present invention is not limited to these embodiments.

Examples of the sound recognition module activated according to an event have been illustrated in the embodiments described with reference to FIGS. 12 to 14, but it would be easily understood that the present invention is not limited to these embodiments.

When a related content providing application is used as a part of the sound recognition module, the related content providing application which is operated in the memory 209 of the mobile receiver 200 transmits the extracted sound wave ID to the server 300. The server 300 may search the related content corresponding to the received sound wave ID (S107). Thereafter, the server 300 transmits the selected related content to the mobile receiver 200, and the mobile receiver 200 displays the related content for the user (S109).

Figure 5:
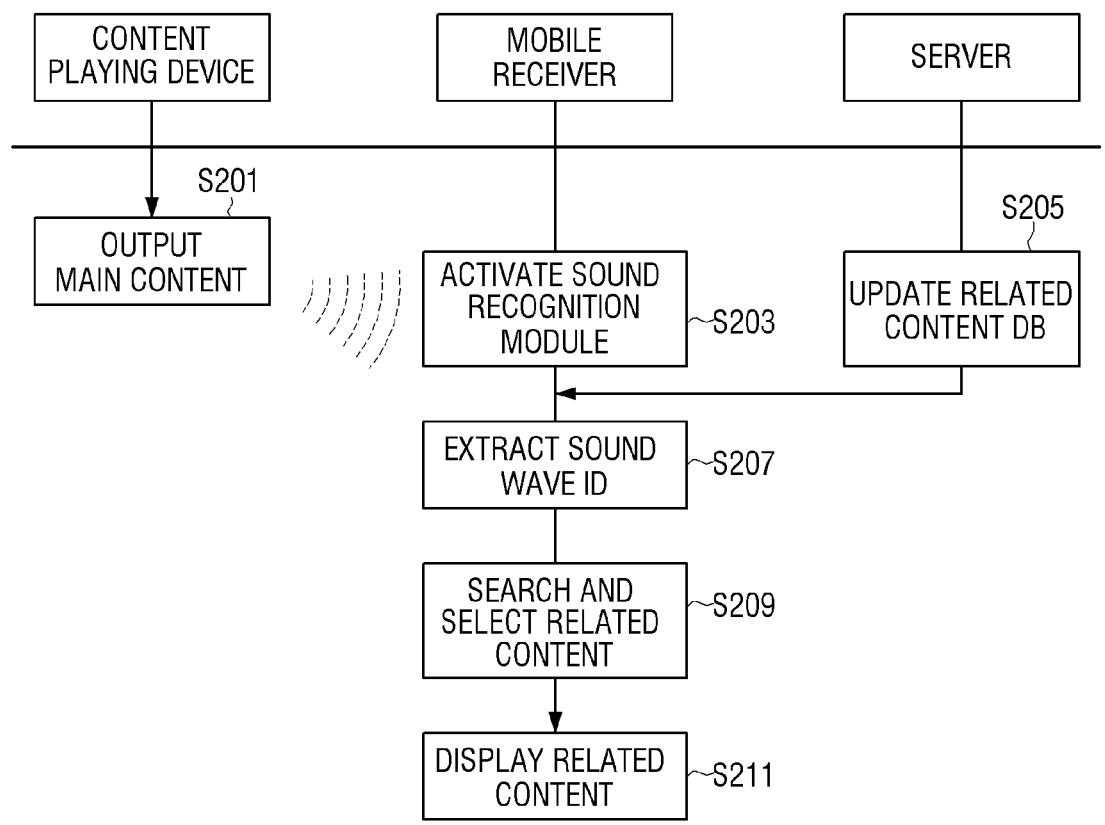
FIG. 5 is a view to illustrate a related content providing method according to an exemplary embodiment of the present invention.

Method for Providing a Related Content Based on a Related Content DB of the Mobile Receiver FIG. 5 is a view to illustrate a method for providing a related content according to an exemplary embodiment of the present disclosure.

On the assumption that the method for providing the related content according to an exemplary embodiment is applied to the system of FIG. 1, the embodiment of FIG. 5 will be described based on differences from the embodiment of FIG. 3.

The method for providing the related content according to an exemplary embodiment may include the steps of: outputting, by the content playing device 100, a main content (S201); activating the sound recognition module of the mobile receiver (S203); extracting a sound wave ID (S207); searching and selecting, by the mobile receiver, a related content corresponding to the sound wave ID extracted in step S205 (S209); and displaying, by the mobile receiver 200, the related content selected in step S209 (S211).

The method for providing the related content according to an exemplary embodiment may further include a step of transmitting, by the server, data for updating regarding a related content DB to the mobile receiver (S205), and the mobile receiver may receive the data for updating from the server and update the related content DB stored therein.

For example, the related content providing application which operates in the memory 209 of the mobile receiver may store the related content DB received from the server 300 in the storage device 211 or update the pre-stored DB. For example, the related content providing application operating in the memory 209 may search and select the related content DB corresponding to the sound wave ID (S209), and display the selected related content through the display unit 213 (S211).

The step of activating the sound recognition module of the mobile receiver (S203) may be activating according to a schedule or activating when a predetermined event occurs in the same way as the step of activating described above with reference to FIG. 4.

Unlike in the embodiment of FIG. 4, in the embodiment of FIG. 5, the mobile receiver 200 directly selects the related content corresponding to the sound wave ID. To achieve this, the server 300 may transmit a part or entirety of the related content DB to the mobile receiver 200, so that a part or entirety of the related content pre-stored in the mobile receiver 200 can be updated.

Time to transmit the related content DB by the server 300 is not limited to the time displayed on FIG. 5. That is, when the server 300 transmits the related content DB to update the related content DB pre-stored in the mobile receiver 200, the time to transmit the related content DB by the server 300 is not limited to specific time.

Method for the Mobile Receiver to Serve as a Content Playing Device

Figure 6:
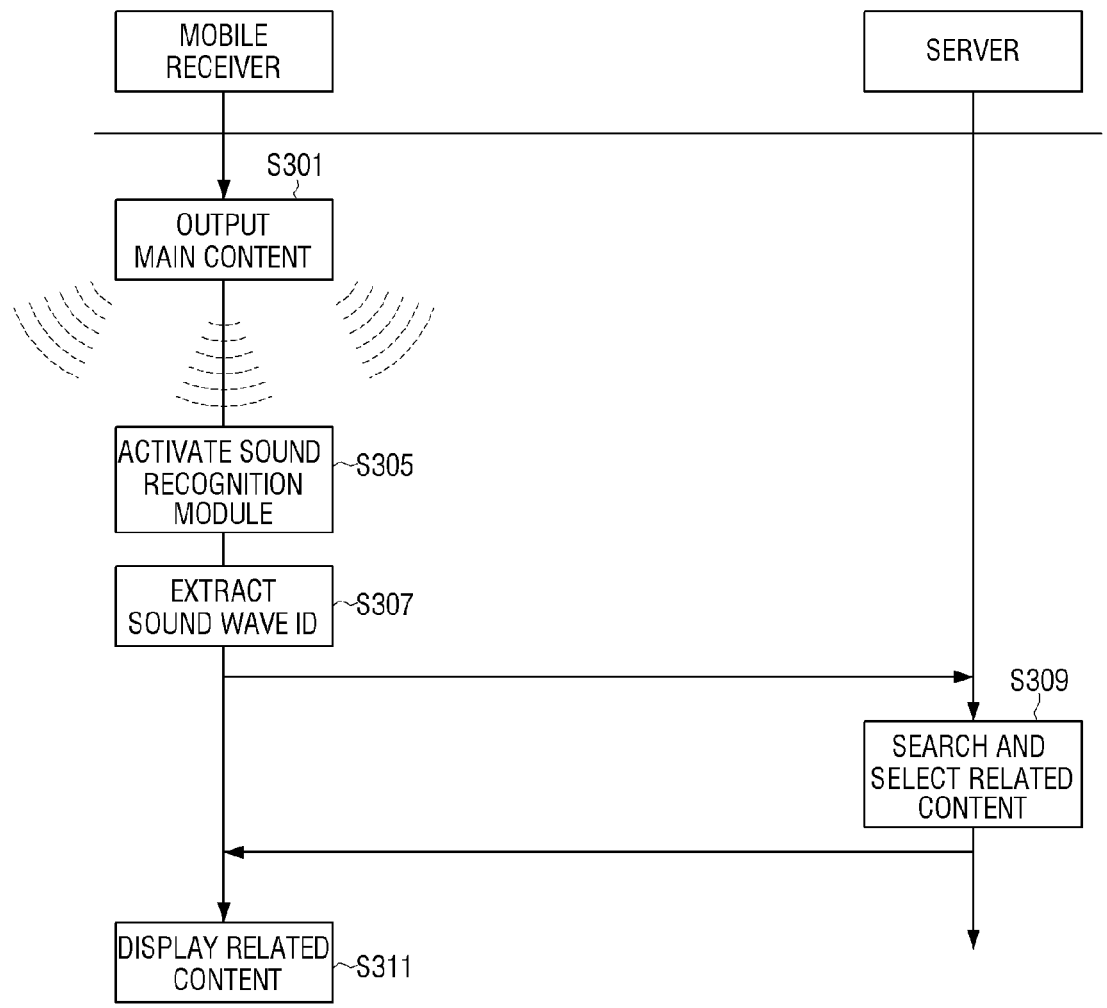
FIG. 6 is a view to illustrate a related content providing method according to an exemplary embodiment of the present invention.

FIG. 6 is a view to illustrate a method for providing a related content according to an exemplary embodiment of the present invention.

It is assumed that, in the system of FIG. 1, the mobile receiver 200 rather than the content playing device 100 outputs a main content and the mobile receiver 200 recognizes a sound. On the assumption that the method for providing the content according to an exemplary embodiment is applied to the system of FIG. 1, the embodiment of FIG. 6 will be described based on differences from the embodiment of FIG. 4.

The method for providing the related content according to an exemplary embodiment may include the steps of: outputting, by the mobile receiver 200, a main content (S301); activating the sound recognition module of the mobile receiver (S305); extracting an sound wave ID (S307); searching and selecting, by the server, a related content corresponding to the sound wave ID extracted in step S307 (S309); and displaying, by the mobile receiver 200, the related content selected in step S309 (S311).

The step of activating the sound recognition module of the mobile receiver (S305) may be activating according to a schedule or activating when a predetermined event occurs in the same way as the step of activating described above with reference to FIG. 4.

Step S307 may be implemented in the following methods, for example.

The first method is to cause the microphone 201 to detect a sound outputted through a speaker (not shown) which is a part of the display unit 213 of the mobile receiver 200, and cause the sound recognition module to extract an ID from the detected sound.

The second method is to cause the sound recognition module to receive digital data from the operating system before the digital data is outputted through the speaker (not shown) which is a part of the display unit 213 of the mobile receiver 200, and extract the sound wave ID.

The third method is to cause an input terminal of the microphone 201 of a headset (not shown) connected with the mobile receiver 200 to be connected with a small sound output terminal of the headset (not shown), and cause the sound recognition module to extract an ID from an electric signal transmitted to a small speaker of the headset (not shown).

The sound recognition module transmits the sound wave ID extracted in step S307 to the server 300 (S307). The server 300 may search and select a related content corresponding to the sound wave ID with reference to the related content DB (which is stored in the server 300 or stored in a separate storage device (not shown)) (S309). The server 300 transmits the result of the selecting to the mobile receiver 200, and the mobile receiver 200 displays the result of the selecting.

Figure 7:
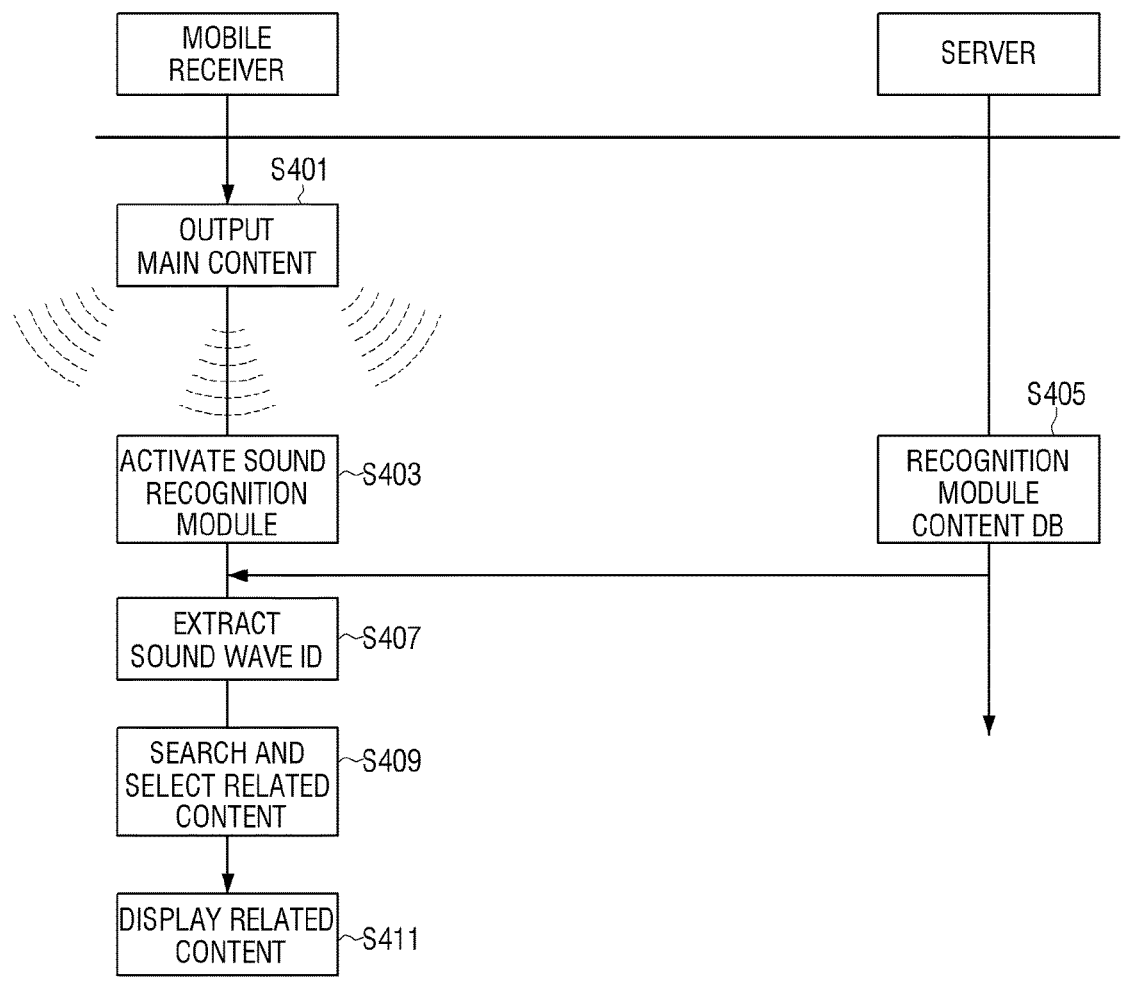
FIG. 7 is a view to illustrate a related content providing method according to an exemplary embodiment of the present invention.

FIG. 7 is a view to illustrate a method for providing a related content according to an exemplary embodiment of the present invention.

It is assumed that, in the system of FIG. 1, the mobile receiver 200 rather than the content playing device 100 outputs a main content and the mobile receiver 200 recognizes a sound. On the assumption that the method for providing the related content according to an exemplary embodiment is applied to the system of FIG. 1, the embodiment of FIG. 7 will be described based on differences from the embodiment of FIG. 4.

The method for providing the related content according to an exemplary embodiment may include the steps of: outputting, by the content playing device 100, a main content (S401); activating the sound recognition module of the mobile receiver (S403); extracting a sound wave ID (S407); searching and selecting, by the mobile receiver, a related content corresponding to the sound wave ID extracted in step S407 (S409); and displaying, by the mobile receiver 200, the related content selected in step S409 (S411).

The method for providing the related content according to an exemplary embodiment may further include the step of transmitting, by the server, data for updating regarding a related content DB to the mobile receiver (S405), and the mobile receiver may receive the data for updating from the server and update the related content DB stored therein.

Step S407 described above may be implemented in the same way as step S307 described above.

The step of activating the sound recognition module of the mobile receiver (S403) may be activating according to a schedule or activating when a predetermined event occurs in the same way as the step of activating described with reference to FIG. 4.

Unlike in the embodiment of FIG. 4, in the embodiment of FIG. 7, the mobile receiver 200 directly selects the related content corresponding to the sound wave ID. To achieve this, the server 300 may transmit a part or entirety of the related content DB to the mobile receiver 200, so that a part or entirety of the related content pre-stored in the mobile receiver 200 can be updated.

Time at which the server 300 transmits the related content DB is not limited to the time displayed on FIG. 7. That is, when the server 300 transmits the related content DB to update the related content DB pre-stored in the mobile receiver 200, the time to transmit the related content DB by the server 300 is not limited to specific time.

Location of a Sound Wave ID Extractable from a Content

Figure 8:
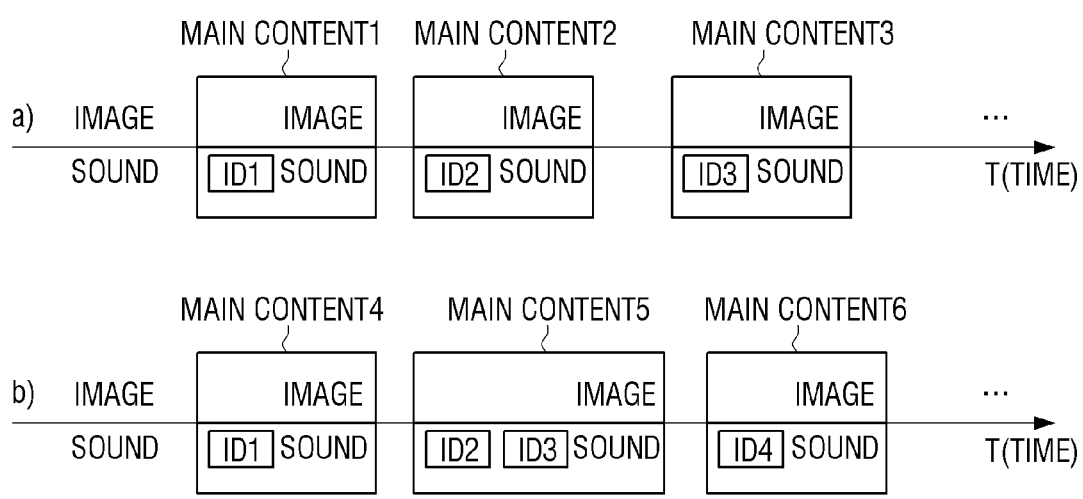
FIG. 8 is a view to illustrate main contents.

FIG. 8 is a view to illustrate a main content.

View (a) of FIG. 8 illustrates examples of main contents, each of which is formed of a combination of an image and a sound and from which a sound wave ID is extracted at corresponding main content time.

For example, on the assumption that the main contents as shown in view (a) of FIG. 8 are outputted in the embodiment of FIG. 4, the operations of the main contents will be described.

The content playing device 100 may output main contents (main contents 1, 2, and 3) with time, and a sound wave ID may be extracted from each of these contents. Sound wave ID 1 may be extracted from a sound when main content 1 is outputted. Sound wave ID 2 may be extracted from a sound when main content 2 is outputted. Sound wave ID 3 may be extracted from a sound when main content 3 is outputted.

The mobile receiver 200 may extract the respective sound wave IDs in sequence and transmit these sound wave IDs to the server 300, and receives related contents corresponding to the sound wave IDs from the server 300 and displays the related contents.

The mobile receiver 200 may extract the sound wave ID according to a schedule or when a predetermined event occurs (that is, intermittently). This is the same as in the above-described exemplary embodiments, and thus a detailed description thereof is omitted.

View (b) of FIG. 8 illustrate other examples of main contents which are outputted through the content playing device, each of which is formed of a combination of an image and a sound, and sound wave IDs may be extracted from the sound.

View (b) of FIG. 8 differs from view (a) of FIG. 8 in that there is a content from which two different sound wave IDs are extracted.

For example, on the assumption that the main contents as shown in view (b) of FIG. 8 are outputted in the embodiment of FIG. 6, the operations of the main contents will be described.

The mobile receiver 200 may output main contents (main contents 4, 5, and 6) with time, and extract the sound wave IDs from the main contents. Sound wave ID 1 may be extracted from a sound when main content 4 is outputted. Sound wave IDs 2 and 3 may be extracted from a sound when main content 5 is outputted. Sound wave ID 4 may be extracted from a sound when main content 6 is outputted.

The mobile receiver 200 may extract the sound wave IDs in sequence and transmit these IDs to the server 300, and receives related contents corresponding to the sound wave IDs from the server 300 and displays the related contents.

Method for Outputting a Related Content without Interfering with Immersion

According to an exemplary embodiment of the present invention, time to display a related content through the mobile receiver may be time when a viewer or listener does not have to get immersed in the main content, for example, when an advertisement or an end title is displayed. For example, when the main content is a drama and the related content is information on an indirect advertisement product appearing in the drama, the mobile receiver may defer displaying the related content on the mobile receiver until the drama ends and the end title is displayed even when the sound wave ID from which the related content is obtained is located in the middle of the drama.

A computer readable recording medium which has a program recorded therein for executing the steps of the method described above with reference to FIGS. 4 to 7 may be provided.

Method for Providing a Related Content

Figure 15:
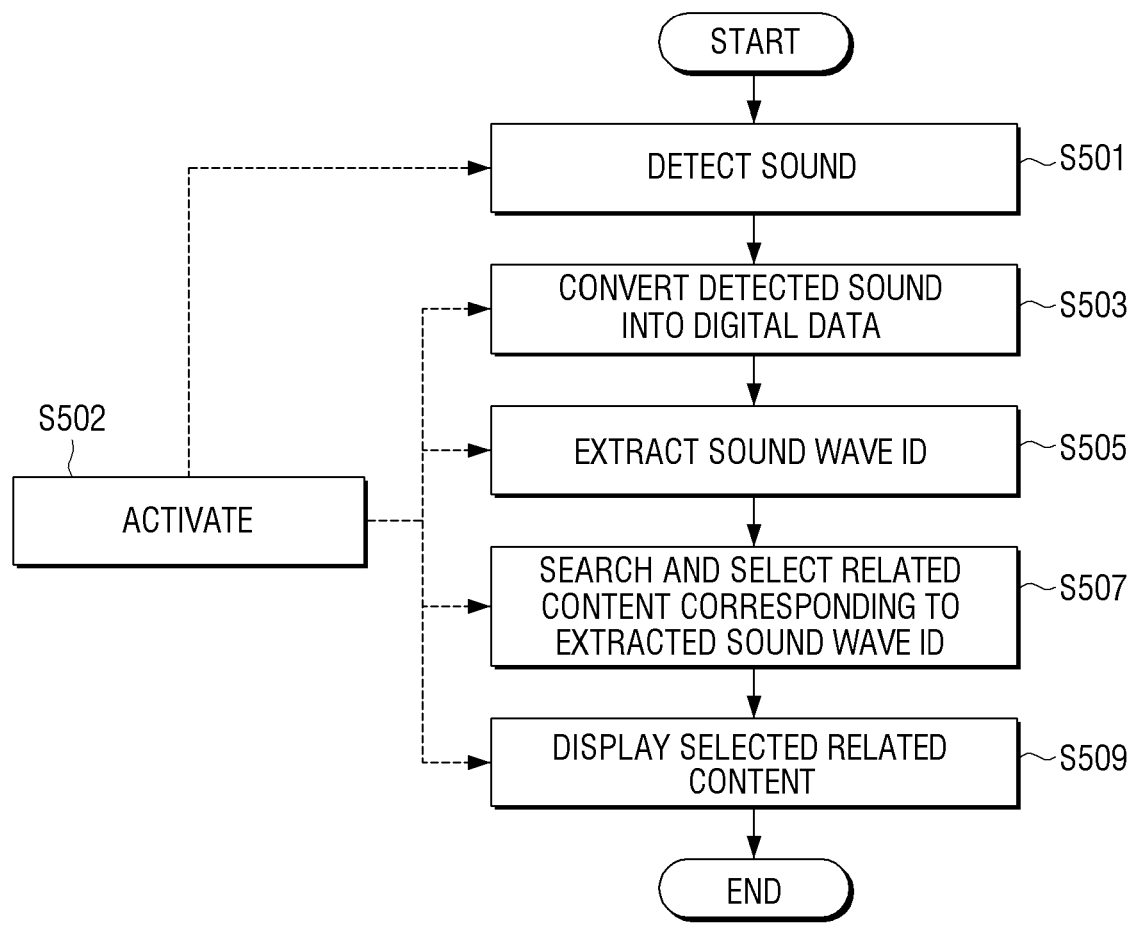
FIG. 15 is a view to illustrate a method for providing a related content according to an exemplary embodiment of the present invention.

FIG. 15 is a view to illustrate a method for providing a related content according to an exemplary embodiment of the present invention.

On the assumption that the method for providing the related content according to an exemplary embodiment of the present invention is applied to the system of FIG. 1, the method for providing the related content according to an exemplary embodiment of the present invention will be described.

Referring to FIG. 15, the method for providing the related content according to an exemplary embodiment of the present invention may include the steps of: detecting, by the mobile receiver 200, a sound outputted from the content playing device which reproduces a content (S501); converting, by the mobile receiver 200, the detected sound into digital data (S503); extracting, by the mobile receiver 200, a sound wave ID from the digital data (S505); searching and selecting a related content corresponding to the extracted sound wave ID (S507); and displaying, by the receiver 200, the selected related content as an image and/or a voice (S509).

In addition, the method for providing the related content according to an exemplary embodiment of the present invention may further include a step of determining whether the sound detected in step S501 has an intensity greater than or equal to a predetermined threshold or not, and the step of determining may be performed between steps S501 and S505.

For example, the step of determining may be performed between steps S501 and S503. In this case, the step of converting the sound detected in step S501 into digital data (S503) may be performed when it is determined that the sound detected in step S501 has the intensity greater than or equal to the predetermined threshold.

In addition, in the method for providing the related content according to an exemplary embodiment, the step of selecting the related content (S507) may be performed by the mobile terminal 200 or the server 300. When the step of searching and selecting the related content (S507) is implemented to be performed by the server 300, the method for providing the related content according to an exemplary embodiment of the present invention may further include the steps of: transmitting, by the mobile receiver 200, the sound wave ID extracted in step S505 to the server 300; and transmitting the related content selected by the server 300 to the mobile receiver 200. Herein, the step of transmitting the sound wave ID to the server 300 may be performed after step S505, and the step of transmitting the related content selected by the server 300 to the mobile receiver 200 may be performed between steps S507 and S509.

In addition, the method for providing the related content according to an exemplary embodiment may further include the steps of: determining whether the sound detected in step S501 has an intensity greater than or equal to a predetermined threshold or not (referred to as step S502 for the purpose of explaining); and activating at least one element of an element for performing step S501, an element for performing step S502, an element for performing step S503, an element for performing step S505, and an element for performing step S507 (referred to as step S504 for the purpose of explaining).

For example, the step of activating (S504) may be the step of activating the element for performing step S501, the element for performing step S502, and the element for performing step S503. In this example, the element for performing step S501, the element for performing step S502, and the element for performing step S503 may be elements which are activated after being in an inactivation state, and the element for performing step S505 and the element for performing step S507 are already activated.

For example, the step of activating (S504) may include the steps of: activating the element for performing step S501 and the element for performing step S502; and, when the result of performing step S502 succeeds, activating the element for performing step S503 and the element for performing step S507.

For example, the step of activating (S504) may include the steps of: activating the element for performing step S501; when a sound is detected as a result of performing step S501 (for example, when a sound belonging to a predetermined band is detected), activating the element for performing step S502 and the element for performing step S503. Herein, the element for performing step S507 and the element for performing step S509 may be already activated, may be activated when step S503 succeeds, or may be activated when step S503 is activated.

For example, the step of activating (S504) may include the steps of: when a sound is detected as a result of performing step S501, activating the element for performing step S502; and, when it is determined that the sound detected in step S501 has an intensity greater than or equal to a predetermined threshold as a result of performing step S502, activating the element for performing step S503 and the element for performing step S505. Herein, when a sound wave ID is extracted as a result of performing step S505, the element for activating step S507 and the element for performing step S509 may be activated simultaneously and in sequence.

For example, the step of activating (S504) may be performed according to a schedule or when a predetermined event occurs. The schedule has been described in detail in the embodiments described with reference to FIG. 4. For example, the step of activating (S504) may be performed according to a schedule as described above in the embodiments described with reference to FIGS. 9 to 11, or may be performed when a predetermined event occurs as described above in the embodiments described with reference to FIGS. 12 to 14.

For example, the step of activating (S504) may be performed periodically and/or aperiodically according to a schedule which is made with reference to a main content schedule. For example, the step of activating (S504) may be performed in a predetermined period during the time that a main content is played. Alternatively, the step of activating (S504) may be performed in a first predetermined period during the time that the main content is played, and may be performed in a second period which is longer than the first period during the time that the main content is not played.

For example, the step of activating (S504) may be performed periodically and/or aperiodically according to a schedule which is made with reference to a sound wave ID schedule. For example, the step of activating (S504) may be performed at the time when the sound wave ID can be extracted.

For example, the step of activating (S504) may be performed in a third predetermined period, and, when the extraction of the sound wave ID fails, but it is determined that there exists the sound wave ID, the step of activating (S504) may be performed in a fourth period which is shorter than the third period. Thereafter, when the ID is extracted, the step of activating (S504) may be performed in the third period.

For example, the step of activating (S504) may be performed in a fifth predetermined period and, when the following equation is satisfied as a result of performing step S502, may be performed in a sixth period which is shorter than the fifth period:

$$\text{Threshold} > \text{Intensity of detected sound} > (\alpha \times \text{threshold}), \text{ (herein, } \alpha \text{ is smaller than 1).}$$

That is, according to an exemplary embodiment, when the intensity of the detected sound is smaller than the threshold but is close to the threshold, it may be determined that it is very likely that there is a sound having a sound wave ID, and, when the above-stated equation is satisfied, the step of activating in a sixth period which is shorter than the fifth period may be performed.

For example, the step of activating (S504) may be performed when a predetermined event occurs. Herein, the event may be an event in which a specific application is executed, an event in which the display unit of the mobile receiver 200 is activated or inactivated, or an event in which the mobile receiver 200 receives a push message from the outside.

Herein, the specific application may be an application which uses a microphone for its own use, but this is merely an example and the specific application may correspond to other applications.

For example, the step of activating (S504) may be performed in a seventh predetermined period, and, when a predetermined event occurs, may not be performed. In addition, when the predetermined event is finished, the step of activating (S504) may be performed again according to a predetermined period (for example, the seventh period).

For example, the step of activating (S504) may include the steps of: when a predetermined event occurs, delivering the occurrence of the event to an operating system (OS) (not shown) of the mobile receiver 200; delivering, by the OS, the occurrence of the event to filters provided in applications operating in the mobile receiver 200; and delivering or refraining from delivering, by the filters, the occurrence of the event to the applications corresponding thereto according to predetermined settings. This operation has been described in detail in the embodiments described with reference to FIG. 14.

In the method for providing the related content described above with reference to FIG. 15, the element for performing the step of detecting the sound may be the microphone, the element for performing the step of converting the sound into the digital data may be the ADC, the element for performing the step of extracting the sound wave ID may be the sound wave ID extraction unit or the related content providing application, the element for performing the step of searching and selecting the related content may be the mobile receiver (for example, the related content providing application) or the server, and the element for performing the step of displaying the related content as the image and/or the voice may be the display unit.

In the method for providing the related content described above with reference to FIG. 15, the mobile receiver detects the sound outputted from the content playing device. However, this is merely an example, and the mobile receiver may be configured to detect the sound outputted from the mobile receiver as in the embodiment of FIGS. 6 and 7.

When the mobile receiver is configured to receive the sound outputted from the mobile receiver, the method for providing the related content may include the steps of: detecting, by the mobile receiver, a sound outputted from the mobile receiver; converting, by the mobile receiver, the detected sound into digital data; extracting, by the mobile receiver, a sound wave ID from the digital data; selecting a related content corresponding to the extracted sound wave ID; and displaying, by the mobile receiver, the selected related content as an image and/or a voice. In addition, the method for providing the related content may further include the steps of: determining whether the detected sound has an intensity greater than or equal to a predetermined threshold; and activating at least one element of an element for performing the step of converting, by the mobile receiver, the detected sound into the digital data, an element for performing the step of extracting, by the mobile receiver, the sound wave ID from the digital data; an element for performing the step of selecting the related content corresponding to the extracted sound wave ID; an element for performing the step of displaying, by the mobile receiver, the selected related content as the image and/or the voice. The step of activating has been described in detail in the above-described embodiments.

Computer-Readable Medium which has a Program Recorded Therein for Executing a Method for Providing a Related Content The method for providing the related content according to the above-described exemplary embodiments of the present invention may be implemented by using a program executed in a mobile receiver which is provided with a memory, a processor, a microphone, and an ADC (referred to as a "program for executing the method for providing the related content" for the purpose of describing). That is, the mobile receiver provided with the memory, the processor, the microphone, and the ADC has a function as a computer, and the method for providing the related content may be implemented in the form of a program which is executed in the mobile receiver.

The program for executing the method for providing the related content according to an exemplary embodiment of the present invention may include a related content providing application.

According to an exemplary embodiment, the program for executing the method for providing the related content may be loaded into the memory and executed under the control of the processor The program for executing the method for providing the related content may execute one of the methods described in the embodiments described above with reference to FIG. 15.

For example, the program for executing the method for providing the related content may execute the steps which can be implemented by using a program from among the steps described with reference to FIG. 15 in the mobile receiver.

For example, the program for executing the method for providing the related content may execute the steps S502, S503, S504, S505, S507, and/or S509 in the mobile receiver. That is, all of the steps S502, S503, S504, S505, S507, and S509 may be implemented by using programs, or some of the steps S502, S503, S504, S505, S507, and S509 may be implemented by using hardware and the other steps may be implemented by using a program. The steps S502, S503, S504, S505, S507, and S509 have been described in detail in the embodiments described with reference to FIG. 15.

While the invention has been described with reference to certain preferred embodiments thereof and drawings, the present invention is not limited to the above-described embodiments and various changes or modification may be made based on the descriptions provided herein by those skilled in the art.

The scope of the present disclosure should not be limited to and defined by the above-described exemplary embodiments, and should be defined not only by the appended claims but also by the equivalents to the scopes of the claims.

What is claimed is:

1. A method for providing a related content in a mobile receiver which comprises a memory, a processor, a microphone to detect a sound outputted from a content playing device which plays a main content, and an ADC to convert the sound detected by the microphone into digital data, the method comprising:
extracting a non-audible sound wave ID from the digital data;
displaying a related content corresponding to the sound wave ID as an image and/or voice;
activating at least one element of elements performing the extracting and the displaying; and
storing a sound wave ID schedule indicating times at which the sound wave ID is extractable,
wherein the sound wave ID is digital data indicating a non-audible sound which is artificially inserted into the sound outputted from the content playing device, or an audible fingerprint ID indicating a characteristic of a sound which is extracted from a sound included as a part of the sound outputted from the content playing device, and
wherein the activating is performed at the time at which the sound wave ID is extractable with reference to the sound wave ID schedule.

2. The method of claim 1, wherein the related content refers to information of a sound, an image, a document, and an Internet address related to details of a main content or background knowledge for delivering the details, and/or a digital identifier value indicating said information.

3. The method of claim 2, wherein the sound wave ID is used to identify the related content, and is used to (1) identify the main content, (2) identify a relative time location within the main content, or (3) identify a related content related to an advertisement at the relative time location within the main content.

4. The method of claim 3, further comprising:
transmitting the sound wave ID to a server; and
receiving the related content corresponding to the sound wave ID from the mobile receiver.

5. The method of claim 1, further comprising:
determining whether the detected sound has an intensity greater than or equal to a predetermined threshold; and
when it is determined that the sound has the intensity greater than or equal to the predetermined threshold, activating the ADC and an element which performs the extracting of the sound wave ID, such that the elements operate.

6. The method of claim 5, wherein an element which performs the determining is activated when the microphone detects a sound belonging to a predetermined band, and
wherein the ADC and the element which performs the extracting of the sound wave ID are activated simultaneously or in sequence when it is determined that the sound has the intensity greater than or equal to the predetermined threshold.

7. The method of claim 1, further comprising:
activating at least one element of elements which performs the extracting and the displaying, according to a schedule or when a predetermined event occurs.

8. The method of claim 7, wherein an element activated by the activating is the microphone, the ADC, and an element which performs the extracting of the sound wave ID.

9. The method of claim 7, wherein the activating is performed in a first period, and, when the intensity (A) of the detected sound satisfies a following equation, is performed in a second period which is shorter than the first period:

$$\text{Threshold} > \text{Intensity of the detected sound} > \alpha \times \text{threshold (herein, } \alpha \text{ is smaller than 1)}.$$

10. The method of claim 7, wherein the activating is performed periodically, and is not performed when a predetermined event occurs at time at which the activating is scheduled to be performed.

11. The method of claim 7, wherein the activating is performed in a first period, and, when the extraction of the sound wave ID fails as a result of performing the extracting of the sound wave ID, but it is determined that there is the sound wave ID, is performed in a second period which is shorter than the first period.

12. The method of claim 7, wherein the event refers to the predetermined event in which a specific application is executed, an event in which a display unit provided in the mobile receiver is activated or inactivated, or an event in which the mobile receiver receives a push message.

13. The method of claim 7, wherein the predetermined event is an event in which an application using a microphone for its own use is executed.

14. The method of claim 7, comprising:
when the predetermined event occurs, delivering occurrence of the event to an operating system;
delivering, by the operating system, the occurrence of the predetermined event to filters which are provided to correspond to applications operating in the mobile receiver; and
delivering or refraining from delivering, by the filters, the occurrence of the predetermined event to the applications corresponding thereto according to predetermined settings.

15. The method of claim 1, wherein the ADC and an element which performs the extracting of the sound wave ID are activated simultaneously or in sequence when the microphone detects a sound belonging to a predetermined band.

16. The method of claim 15, further comprising:
selecting the related content, and
wherein an element which performs the selecting of the related content, and an element which performs the displaying of the related content as the image and/or the voice are activated simultaneously and in sequence when the sound wave ID is extracted from the digital data.

17. A method for providing a related content in a mobile receiver which comprises a memory, a processor, a microphone to detect a sound outputted from a content playing device which plays a main content, and an ADC to convert the sound detected by the microphone into digital data, the method comprising:
extracting a non-audible sound wave ID from the digital data;
displaying a related content corresponding to the sound wave ID as an image and/or voice;
activating at least one element of elements which performs the extracting and the displaying; and
storing a main content schedule indicating times at which the main content is played,
wherein the sound wave ID is digital data indicating a non-audible sound which is artificially inserted into the sound outputted from the content playing device, or an audible fingerprint ID indicating a characteristic of a sound which is extracted from a sound included as a part of the sound outputted from the content playing device, and
wherein the activating is performed according to the time at which the main content is played with reference to the main content schedule.

18. The method of claim 17, wherein the activating is performed in a predetermined period during the time that the main content is played.

19. The method of claim 17, wherein the activating is performed in a first period during the time that the main content is played, and is performed in a second period which is longer than the first period during the time that the main content is not played.

* * * * *